(12) United States Patent
Neukermans et al.

(10) Patent No.: US 6,744,550 B2
(45) Date of Patent: Jun. 1, 2004

(54) TWO-DIMENSIONAL MICRO-MIRROR ARRAY ENHANCEMENTS

(75) Inventors: Armand P. Neukermans, Portola Valley, CA (US); Timothy G. Slater, San Francisco, CA (US); Marc R. Schuman, San Francisco, CA (US); Jack D. Foster, Los Altos, CA (US); Sam Calmes, Los Altos, CA (US); Sateesh S. Bajikar, San Jose, CA (US); Arun Malhotra, San Jose, CA (US); Jane Ang, San Jose, CA (US); Jerry Hurst, San Jose, CA (US); John Green, Scotts Valley, CA (US)

(73) Assignee: Xros, Inc., Santa Clara, CA (US)

( * ) Notice: Subject to any disclaimer, the term of this patent is extended or adjusted under 35 U.S.C. 154(b) by 13 days.

(21) Appl. No.: 10/157,354

(22) Filed: May 28, 2002

(65) Prior Publication Data

US 2003/0076576 A1 Apr. 24, 2003

Related U.S. Application Data

(63) Continuation of application No. 09/715,945, filed on Nov. 16, 2000, now abandoned.
(60) Provisional application No. 60/207,752, filed on May 30, 2000, provisional application No. 60/203,617, filed on May 12, 2000, provisional application No. 60/183,117, filed on Feb. 17, 2000, provisional application No. 60/183,246, filed on Feb. 17, 2000, provisional application No. 60/168,291, filed on Dec. 1, 1999, and provisional application No. 60/165,863, filed on Nov. 16, 1999.

(51) Int. Cl.[7] .............................................. G02B 25/00
(52) U.S. Cl. ...................................... 359/291; 359/290
(58) Field of Search ................................. 359/290, 291, 359/295, 223, 224, 298, 348, 203, 205; 73/504.02, 504.12

(56) References Cited

U.S. PATENT DOCUMENTS

| | | | |
|---|---|---|---|
| 5,523,878 A | * | 6/1996 | Wallace et al. ............. 359/290 |
| 5,629,790 A | | 5/1997 | Neukermans et al. |
| 5,648,618 A | | 7/1997 | Neukermans et al. |
| 6,000,280 A | | 12/1999 | Miller et al. |
| 6,044,705 A | | 4/2000 | Neukermans et al. |
| 6,124,663 A | | 9/2000 | Haake et al. |
| 6,175,443 B1 | * | 1/2001 | Aksyuk et al. ............. 359/291 |
| 6,285,490 B1 | * | 9/2001 | Meier et al. ................ 359/291 |

OTHER PUBLICATIONS

Chan et al., "Effects of capacitors, resistors and residual charge on the static and dynamic performance of electrostatically–actuated devices," Center for Integrated Systems, Stanford Univ. 120–129 (1999).

Chu et al., "Analysis of Closed–loop Control of Parallel–Plate Electrostatic MicroGrippers," Univ. of CA 820–825 (1994).

Dotzel et al., "Silicon Mirrors and Micromirror Arrays for Spatial Laser Beam Modulation," Technical University Chemnitz–Zwickau, Germany 1997.

(List continued on next page.)

*Primary Examiner*—Scott J. Sugarman
*Assistant Examiner*—Jack Dinh
(74) *Attorney, Agent, or Firm*—Fish & Richardson P.C.

(57) ABSTRACT

A micro-mirror strip assembly having a plurality of two-dimensional micro-mirror structures with improved deflection and other characteristics is presented. In the micro-mirror structures, electrodes for electrostatic deflection are disposed on conical or quasi-conical entities that are machined, attached or molded into a substrate. The electrodes are quartered approximately parallel to or offset by 45 degrees from rotational axes to form quadrants. Torsion sensors are provided along the axes of rotation to control deflection of the quadrant deflection electrodes.

26 Claims, 31 Drawing Sheets

OTHER PUBLICATIONS

Henri et al., "Fabrication, Simulation and Experiment of a Rotating Electrostatic Silicon Mirror With Large Angular Deflection," Laboratoire d'Analyse et d'Architecture des Systemes, CNRS 7, France. Date N/A.

Seeger et al., "Dynamics and Control of Parallel–Plate Actuators Beyond the Electrostatic Instability," University of CA. Date N/A.

Van Den Boom et al., "Offset Reduction in Hall Plates: Simulations and Experiments," Electronic Instrumentation Laboratory, (1988).

Wagner et al., "Infrared Micromirror Array with Large Pixel Size and Large Deflection Angle," Fraunhofer Institute for Silicon Technology (1997).

* cited by examiner

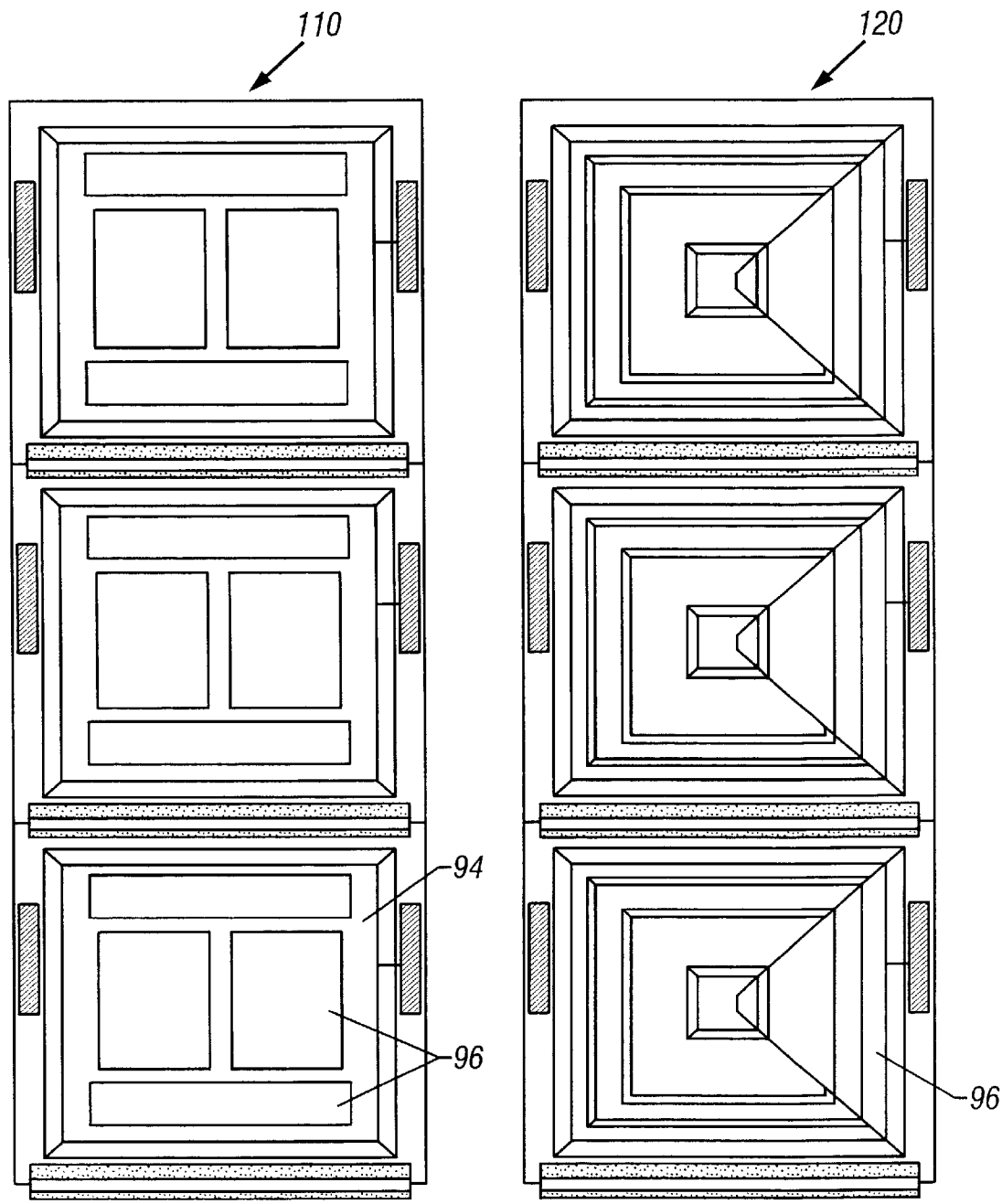
*FIG. 8A*  *FIG. 8B*

FIG. 21A  FIG. 21B

TWO-DIMENSIONAL MICRO-MIRROR ARRAY ENHANCEMENTS

CROSS REFERENCE TO RELATED APPLICATIONS

This application is a continuation of U.S. patent application Ser. No. 09/715,945, which became abandoned Jul. 19, 2002, entitled "Two-Dimensional Micro-Mirror Array Enhancements", filed on Nov. 16, 2000, the disclosure of which is incorporated herein by reference in its entirety for all purposes, which claims priority from the following U.S. Provisional Patent Applications, the disclosures of which are incorporated herein by reference in their entirety for all purposes:

U.S. Provisional Patent Application Serial No. 60/165,863, entitled "Improvements for an Optical N×N Switch," filed Nov. 16, 1999; U.S. Provisional Patent Application Serial No. 60/168,291, entitled "Scanner Improvements for an Optical N×N Switch," filed Dec. 1, 1999; U.S. Provisional Patent Application Serial No. 60/183,246, entitled "Arrangements for Dense Mirror Deflector Arrays," filed Feb. 17, 2000; U.S. Provisional Patent Application Serial No. 60/183,117, entitled "Arrangements for Sensors and Electrodes," filed Feb. 17, 2000; U.S. Provisional Patent Application Serial No. 60/203,617, entitled "Packaging Arrangement for Fiber Optic Switch," filed May 12, 2000; and U.S. Provisional Patent Application Serial No. 60/207,752, entitled "Integrated Deflection Structures with SOI Mirrors," filed May 30, 2000.

BACKGROUND OF THE INVENTION

The invention relates to optical networking devices such as cross-connect switches and, more particularly, to cross-connect switches that use micromachined mirror arrays.

The huge bandwidth of optical fibers, in combination with enormous growth of data and voice traffic, has led to a significant amount of recent development activity in the field of optical communications. Advances have occurred in architectures and network components, such as optical switches.

One approach to optical switching involves the use of micro-machined mirror arrays. Prior efforts using this approach, like those of other approaches, tend to have certain shortcomings, such as limited scalability and a relatively low level of integration.

SUMMARY OF THE INVENTION

In an aspect of the invention, a structure includes a reference member having a raised portion thereon, a mirror suspended above the raised portion and driving devices disposed on the raised portion to impart rotational motion to the mirror in two axes of direction.

In another aspect of the invention, a method of fabricating micro-mirror structures in a micro-mirror strip of micro-mirror structures includes forming a pyramidal structure from a substrate material and defining electrodes on the pyramidal structure.

In yet another aspect of the invention, a micro-mirror strip assembly includes a frame, an array of two-dimensional deflecting mirrors mounted in the frame and dams disposed between the mirrors to block viscous interaction between each of the two dimensional deflecting mirrors and adjacent ones of the two-dimensional deflecting mirrors in the array.

In still yet another aspect of the invention, a hinge includes a plurality of parallel hinge sections provided by vertical slots therein, the slots and parallel hinge sections being dimensioned to provide vertical and lateral stiffness to and a minimal torsion spring constant for the hinge.

Among the advantages of the present invention are the following. The placement of the electrodes on raised structures on a substrate provides for increased electrostatic force, as well as enhanced instability, thus lowering the required drive voltage and enhancing the deflection angles of the mirrors. The slotted hinge has high torsional flexibility and high stiffness (both vertically and laterally). The dam feature overcomes the undesirable effects of the interaction of the flow of air from adjacent mirrors in a micro-mirror strip assembly.

Other features and advantages of the invention will be apparent from the following detailed description and from the claims.

BRIEF DESCRIPTION OF THE DRAWINGS

FIGS. 8A–8C are different views of s micro-mirror structures including dam structures (FIGS. 8A–8B) and added dam structures (FIG. 8C) to cancel viscous interaction between the various mirrors.

FIGS. 21A–21C are illustrations of a dense deflecting array as used in two-dimensional deflection schemes and an air channel underneath the mirrors.

DETAILED DESCRIPTION

Figure 1A:
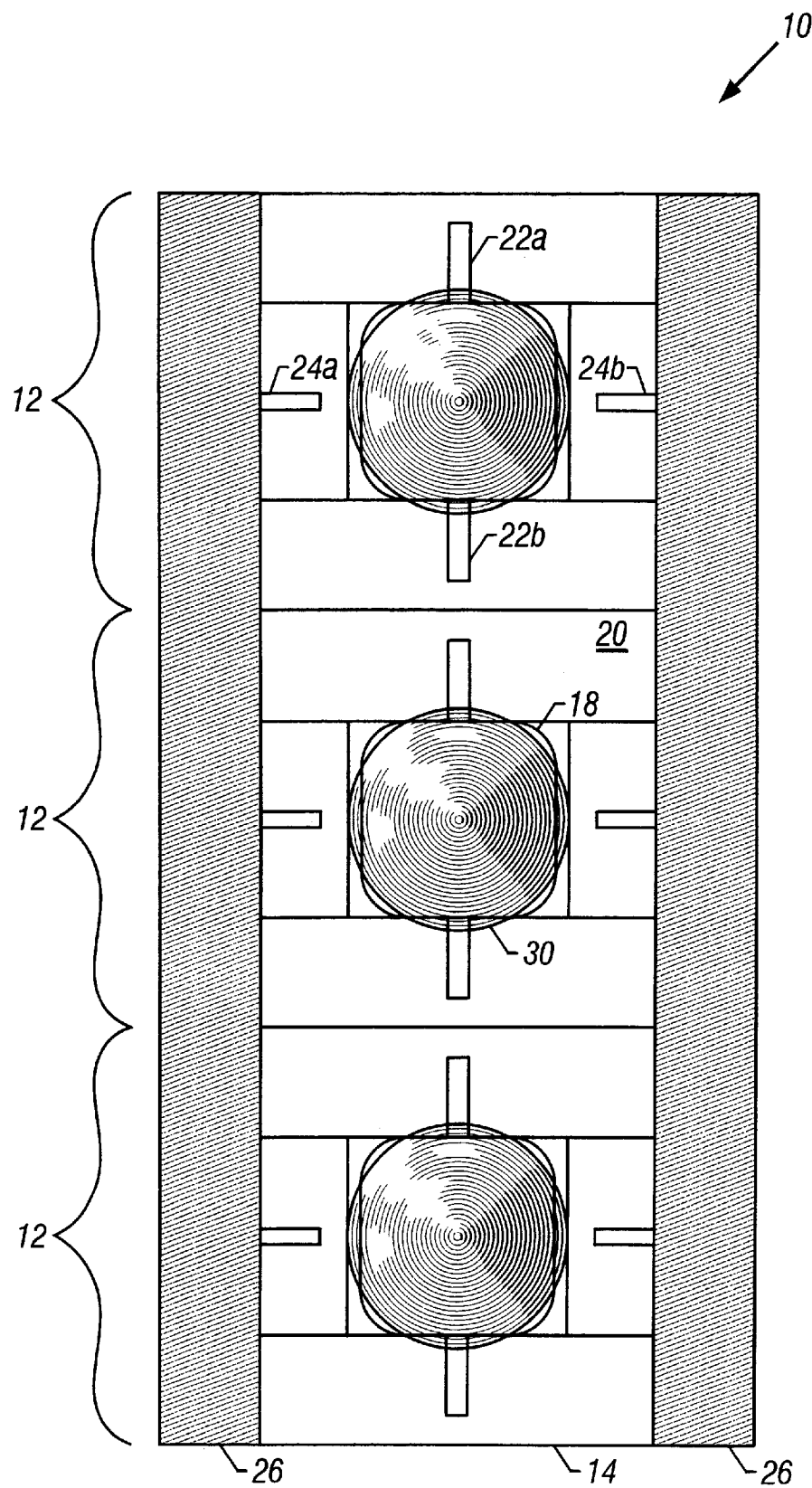
FIG. 1A is a top plan view of a micro-mirror strip assembly.
Figure 1B:
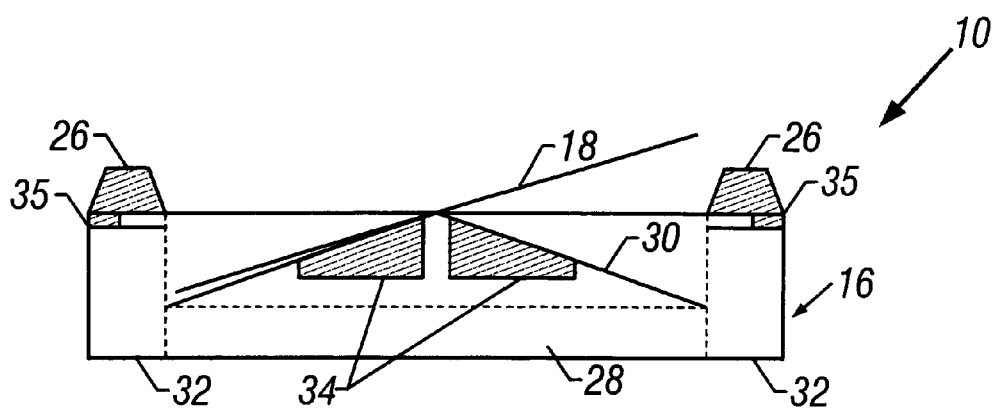
FIG. 1B is a side view of the micro-mirror strip assembly of FIG. 1.

With reference to FIGS. 1A–1B, a micro-mirror strip assembly 10 includes a plurality of micro-mirror structures 12, each of the micro-mirror structures 12 including a mirror arrangement 14 disposed above and supported over a top surface of a reference member or substrate 16. As shown in FIG. 1A, each mirror arrangement 14 includes a mirror 18 coupled to mirror frame 20 by a first pair of torsion members 22a, 22b. The mirror arrangement 14 further includes a second pair of torsion members 24a, 24b, which couple the mirror frame 20 to strips 26.

Referring to FIG. 1B, the substrate 16 includes a base portion 28, a raised portion 30 on the base portion 28, and sidewall portions 32 on either side of the base portion 28. The substrate may be made of ceramic or other suitable materials. The strips 26 are located on top of the sidewalls 32. As shown by the raised portion 30 (FIG. 1A), the raised portion 30 is conical or quasi-conical in shape.

Electrodes 34 are disposed on the surface of the raised portion 30 to impart a rotational motion to the mirror 18 and the mirror frame 20 (shown in FIG. 1A). The electrodes 34 control the inner rotation of the mirror arrangement around the torsion members 22a, 22b ("x-axis"), as well as control the outer rotation of the mirror arrangement around the torsion members 24a, 24b ("y-axis"). Although the raised portion 30 has been thus described as having a cone or cone-like form, it may take any shape or structure that allows the electrodes 34 to be positioned close to the mirror arrangement 14 and support rotational movement of the mirror arrangement in the x-y plane.

Preferably, the mirror arrangement 14 and the electrodes 34 are so positioned relative to the cone 30 such that the cone 30 is centered approximately under the mirror 18. Substrate areas beneath the mirror frame 20 need not be conical, but may be sloped on such an angle as required to allow the mirror arrangement 14 to rotate freely through its outer axis of rotation around torsion members 24a, 24b. These substrate areas can be machined linearly in the substrate 16, thus simplifying the fabrication of the substrate 16.

As can be seen in FIG. 1B, a spacer 35 can be used between each of the strips 26 and the sidewall portions 32 of the substrate 16 below such strips 26. Typically, spacers in conventional micro-mirror structures having planar substrates are on the order of 150 microns. The spacer 35 of the micro-mirror structure 12 can be as thin as 25 micron or even less, or could even be eliminated altogether, given the effective separation between the electrodes and mirror arrangement as determined by the cone-like shape of the raised portion 30. Also, because that separation is smaller and more uniform, the maximum electric field can be reduced, improving the protection against breakdown. The angles in the bottom of the substrate 12 are not critical. Typically, because the substrate 16 is made in sections of 4.5"×4.5", the sections are all made together. The substrate material may be machined in vertical and horizontal directions to remove material under a desired angle. The cone or cone-like shape is ground on the top to complete the substrate structure or can be etched into the substrate surface. Alternatively, a mold may be made to cast the substrate material in a green state.

There are alternatives to forming a raised portion on the substrate. One such alternative is described later with reference to FIG. 28.

Figure 2:
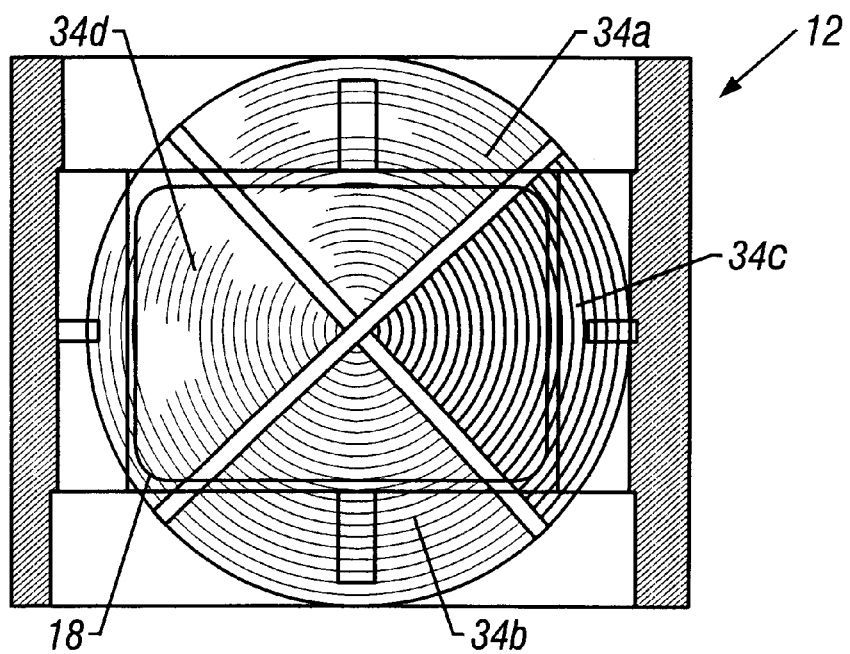
FIG. 2 is a plan view of a single micro-mirror structure having electrodes arranged on the conical substrate.

Thus, as introduced above, and shown in FIG. 2, the electrodes 34, shown here as four electrodes 34a, 34b, 34c, 34d, are disposed on the cone 30 to deflect the mirror arrangement 14 in both axes. Since the mirror arrangement 14 is near the substrate 12, enhanced electrostatic forces allow the use of smaller deflection plates for the electrodes such that the mirror is easily deflected in both axes. As will be described, a first sensor controls the deflection in one axis and second, another sensor controls the deflection in the other axis. Thus, with the particular positioning of the electrodes 34, there is a stronger interaction between axes under the control of the sensors. Additionally, a small DC bias can be applied to the electrodes to render the mirror inherently unstable. Since the position of the mirror is unstable without the application of a servo signal even when the applied driving signal is zero, a large deflection with relatively small imposed driving signals is therefore possible.

Figure 3A:
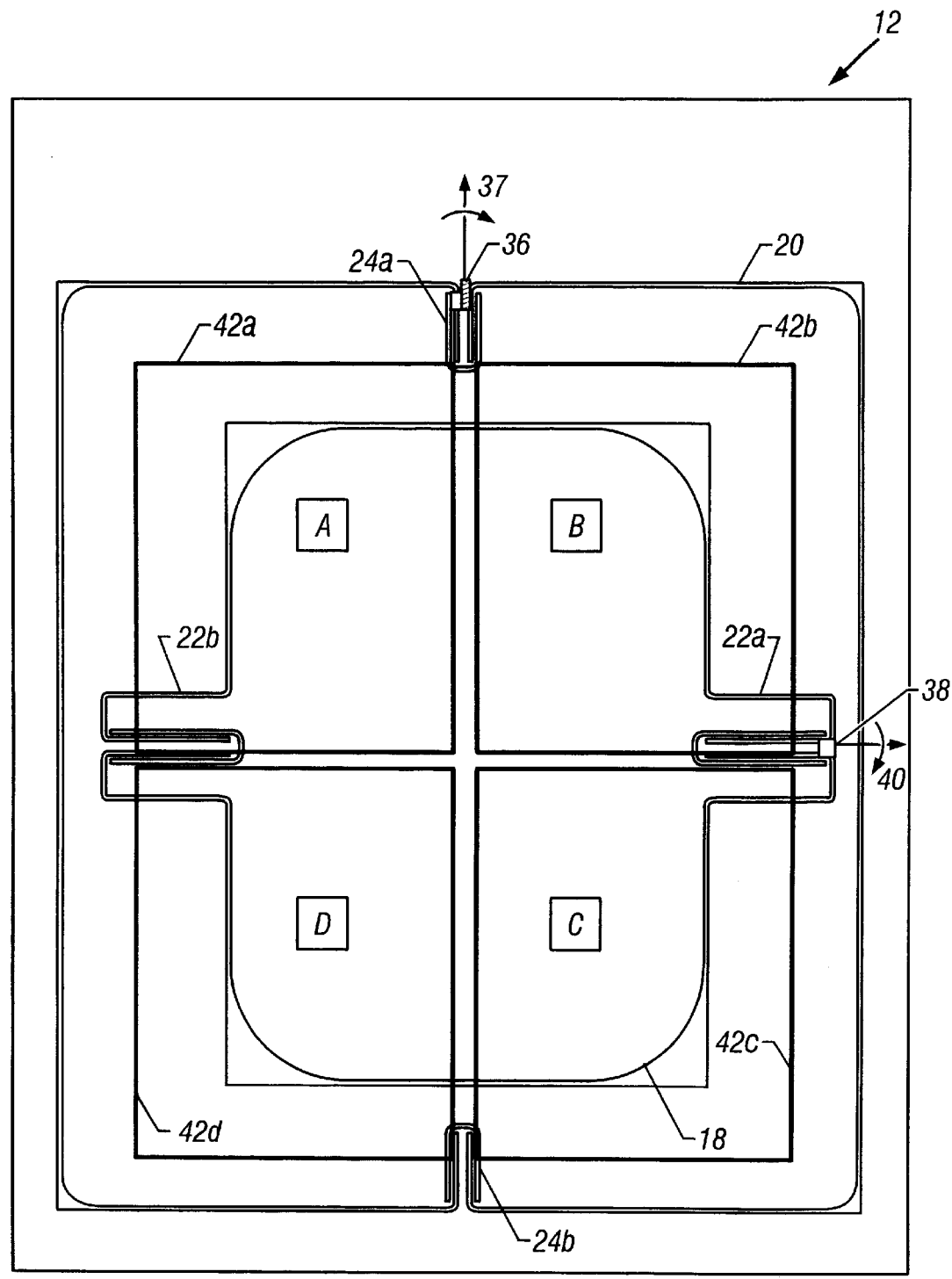
FIGS. 3A and 3C are plan views of the micro-mirror structure with alternative arrangements of electrodes.

Referring to FIG. 3A, the micro-mirror structure 12 (of FIG. 1A) further includes two torsion sensors, a first torsion sensor 36 and a second torsion sensor 38. The first torsion sensor 36 is located in one of outer torsion members 24, specifically the torsion member 24a, and detects outer axis rotation in the direction of arrow 37. The second torsion sensor 38 is located in one of the inner torsion members 22, specifically the torsion member 22a, and detects inner axis rotation in the direction of arrow 40).

The torsion members 22, 24 are depicted as bifold hinges, but may be implemented with other types of devices, as will be described later. The four deflection plates or electrodes 34 (not shown) are arranged in quadrant form, with the letters "A", "B", "C" and "D" being used to represent the underlying electrodes 34a, 34b, 34c, 34d in corresponding quadrants 42a, 42b, 42c and 42d (shown in bold). Increasing voltage applied to both B and C and decreasing the voltage applied to A and D produces rotation along the outer axis 37. Likewise, a voltage decrease in both A and B, and a voltage increase in D and C produces rotation along the inner axis 40. The sensors 36, 38 produce signals when rotation occurs along either the outer axis or inner axis. Hence, the output of torsion sensors 36, 38 may be used to produce stable electrostatic servo control. It will be appreciated that, in this particular embodiment, the organization of or quartering of the electrodes into four electrodes in four corresponding quadrants is along lines parallel to the rotation axes 37, 40.

Figure 3B:
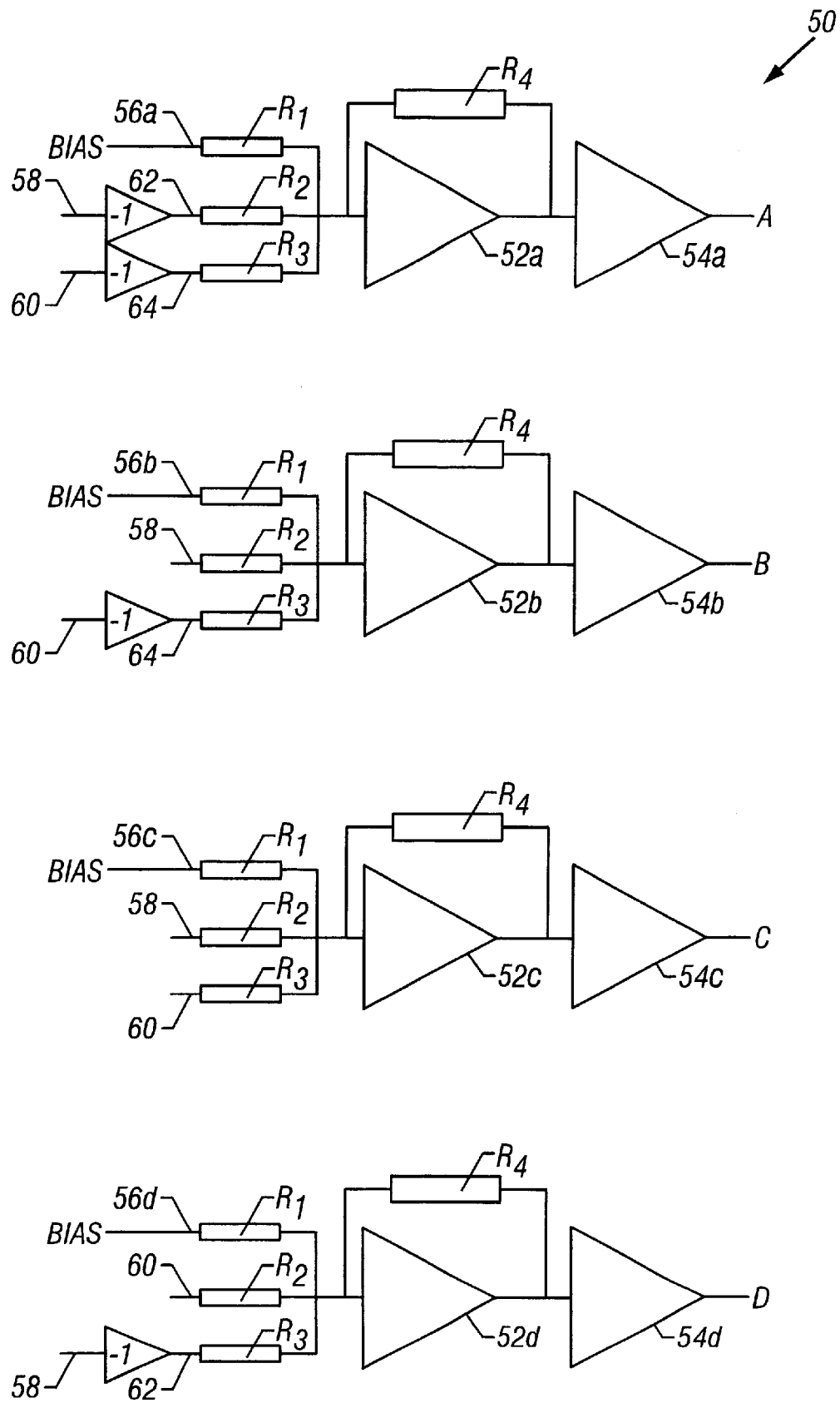
FIGS. 3B and 3D are schematic diagrams of servo control arrangements for electrodes of FIGS. 3A and 3C, respectively.

Referring to FIG. 3B, a servo control system 50 includes summing amplifiers 52a, 52b, 52c, 52d connected to and followed by high voltage amplifiers 54a, 54b, 54c, 54d to drive the deflection plates (indicated by A, B, C, D), respectively. Preferably, the plates A, B, C, D are DC biased with a bias voltage near the middle of the supply range to linearize the drive characteristics so that the net torque on the mirror is zero when the mirror is at rest and not angled. If the four deflection plates are sitting on a cone, the mirror may be made inherently unstable along either or both axes. The respective outputs of the torsion (shear) sensors 36, 38, indicated as 58 and 60, respectively, are provided to all four plates (via the amplifiers 52 and 54), but with different weights for different plates. The amplifier 52a has at least 3 inputs: an offset voltage 56a that produces the bias voltage to linearize the servo control, the inverted output of sensor 36 (input 62) and the inverted input of sensor 38 (input 64). These sensor feedback voltages may have different gains applied to them, as indicated by R2 and R3, to account for the effects of different torques around the different axes 37, 40.

By the same arrangement, the amplifier 52b receives a DC bias 56b, an input for sensor 36 (input 58) and the inverted input from sensor 38 (input 64), adjusted with the appropriate weights to produce the desired output. The electrodes represented by C and D are driven in similar fashion. Since the outputs of both sensors 36, 38 interact with all four plates A, B, C, D, additional feedback between the control loops of the axis 37 and axis 40 may be required to optimize the control. The sign of the sensor feedback voltages is adjusted as necessary to give correct feedback.

The servo control arrangement of FIGS. 3A–3B can be used with planar electrodes, but is particularly advantageous when the electrodes are placed on a conical or quasi-conical substrate like that shown in FIGS. 1A–1B. The torsion sensors 36, 38 (from FIG. 3A) may be of the four terminal type, or may be a resistor bridge arranged to measure shear.

Figure 3C:
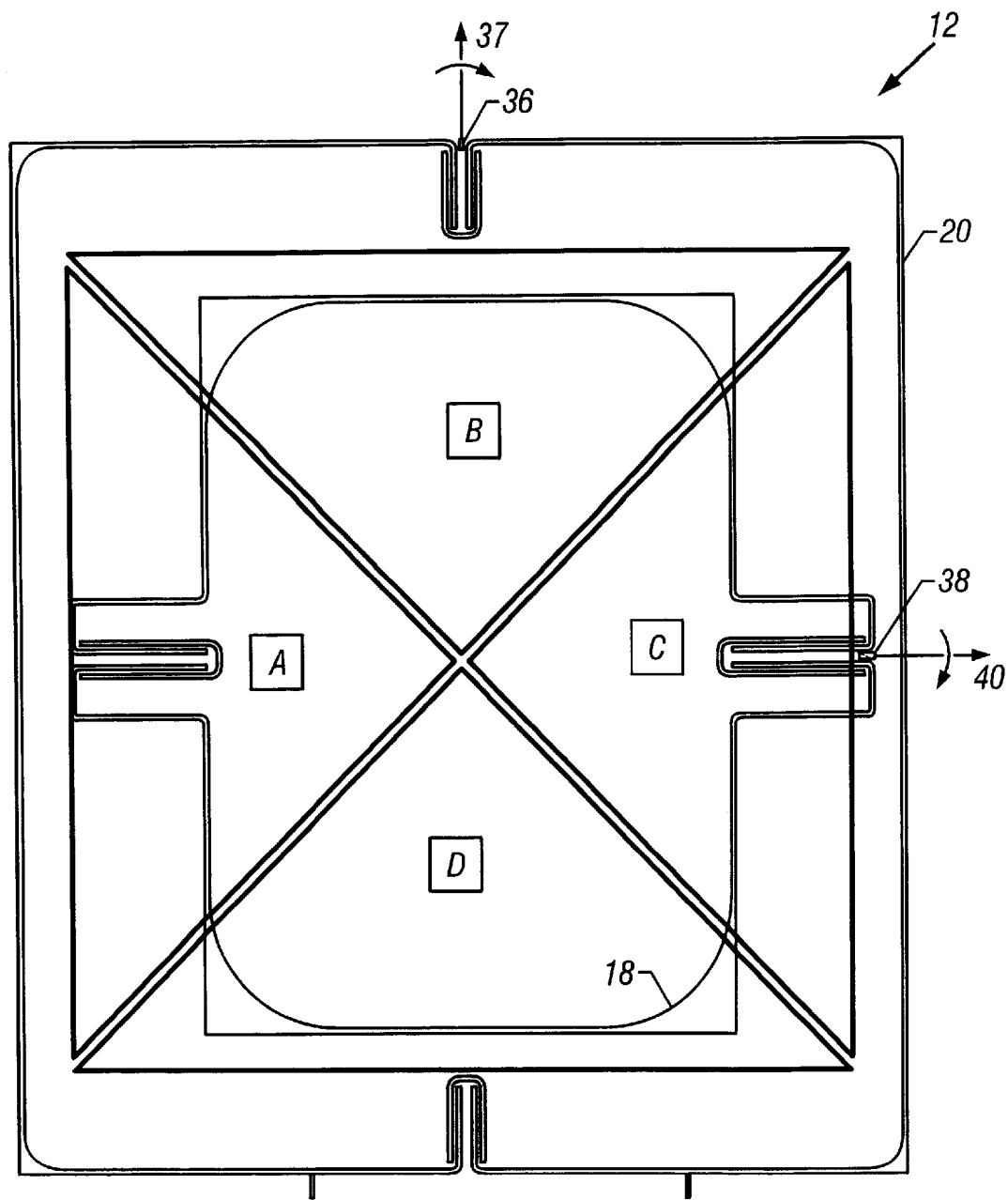

Referring to FIG. 3C, in an alternative arrangement of the micro-mirror structure 12, the electrodes 34 are divided among the diagonals of the rotation axes 37 and 40. That is, the organization of or quartering of the electrodes into four electrodes in four corresponding quadrants occurs at a 45 degree angle relative to the rotation axes 37, 40. The sensor 38 predominantly controls the output of plates B and D, and the sensor 36 predominantly controls the output of plates A and C. To increase torque along the axis 37, the plates B and D may also be used, by increasing the voltage to both plates simultaneously. Increasing the voltage to both of plates B and D simultaneously serves to increase the tilt of the plate in the direction in which it is already tilted. Likewise, increasing the voltage to both A and C increases the tilt around the axis 40 in the direction in which it is already tilted, since the mirror section is closer to the plates. Hence, when feedback is used from these plates around either axis, it must be weighted with the sign of the rotation around that particular axis. This is schematically illustrated in FIG. 3D.

Figure 3D:
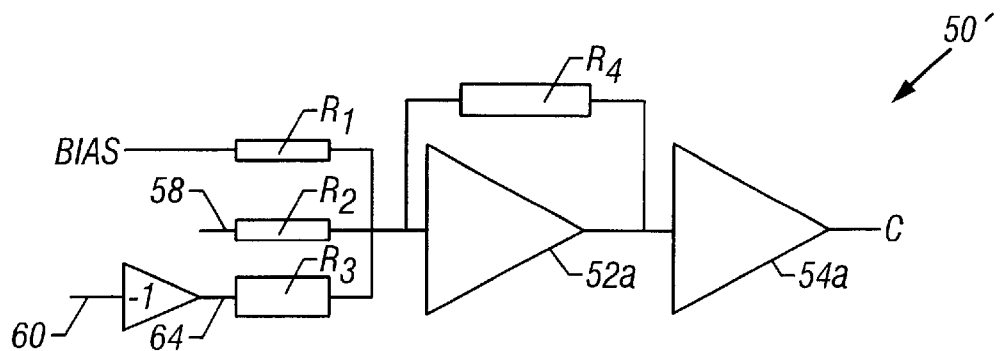
Figure 3D:
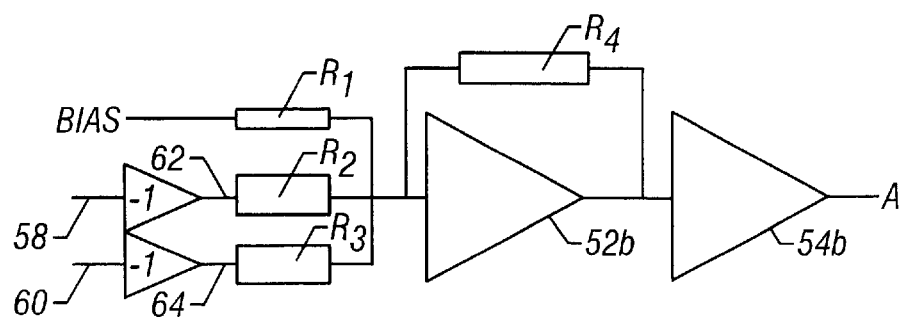
Figure 3D:
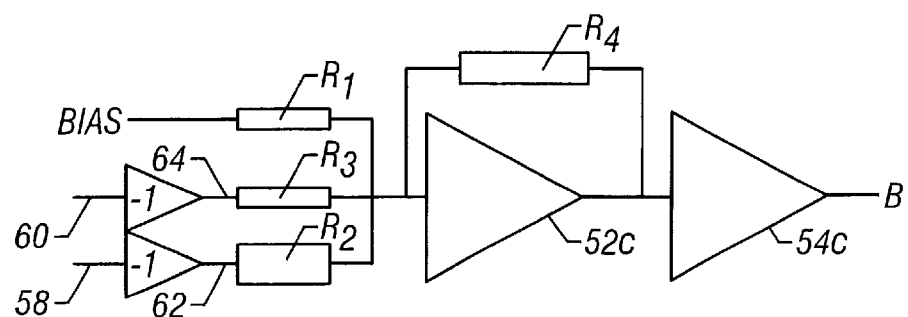
Figure 3D:
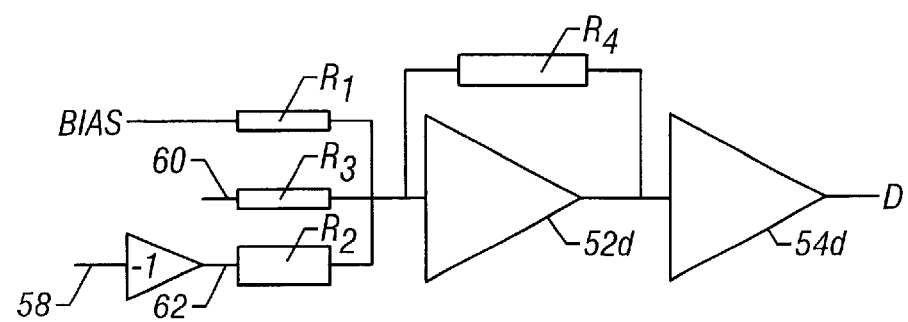

Referring now to FIG. 3D, in a servo control system 50' for the alternative arrangement of the electrodes, the inputs take into account the new orientation of the plates with respect to the sensors. For example, plate C has as inputs the bias voltage, the output from the sensor 36 and the signal from the sensor 38, weighted with the sign of the rotation around the axis 40, to produce the correct feedback from the sensor 38. Likewise, the plate A is weighted with the same inputs, but the sign of the sensor 36 is inverted. Again, the weights (i.e., the ratios of the resistors) for different plates may be individually adjusted. Note that in either of the arrangements of FIGS. 3A and 3C, the plates A, B, C, D may be arranged to cover the mirror 18, or both the mirror 18 and the surrounding mirror frame 20.

Figure 4A:
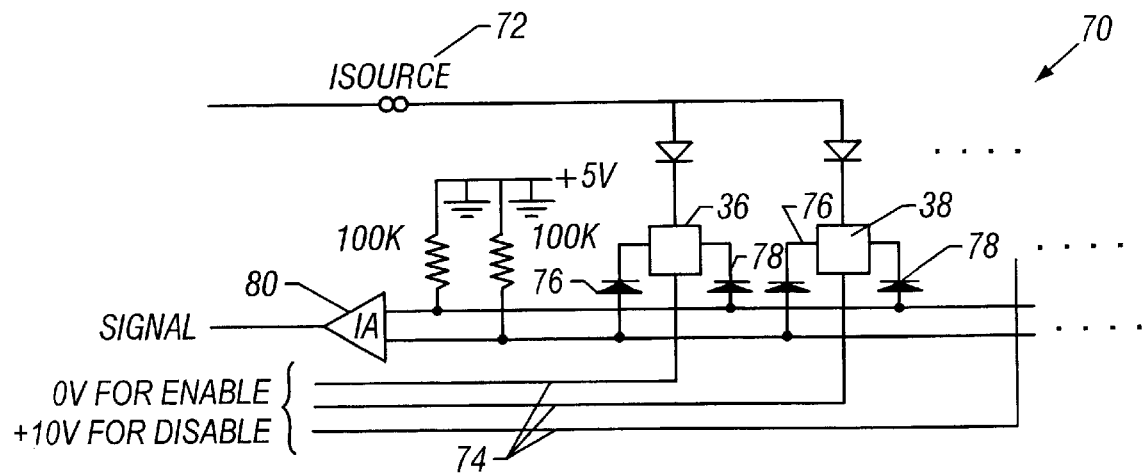
FIGS. 4A and 4B are schematic diagrams of select circuits.

It is possible to reduce the number of leads to each of the torsion sensors 36, 38. Referring to FIG. 4A, a torsion sensor select circuit 70 connects a current source 72 to one of the sensors 36 or 38 using enabling lines 74, which carry a voltage of e.g., 0V for enable and +10V for disable. 74, The sensor select circuit 70 couples outputs for the selected one of the sensors 36, 38 to respective forward biased diodes 76, 78, and an instrumentation amplifier 80. The output signal produced by the instrumentation amplifier 80 is provided to the servo control system.

Figure 4B:
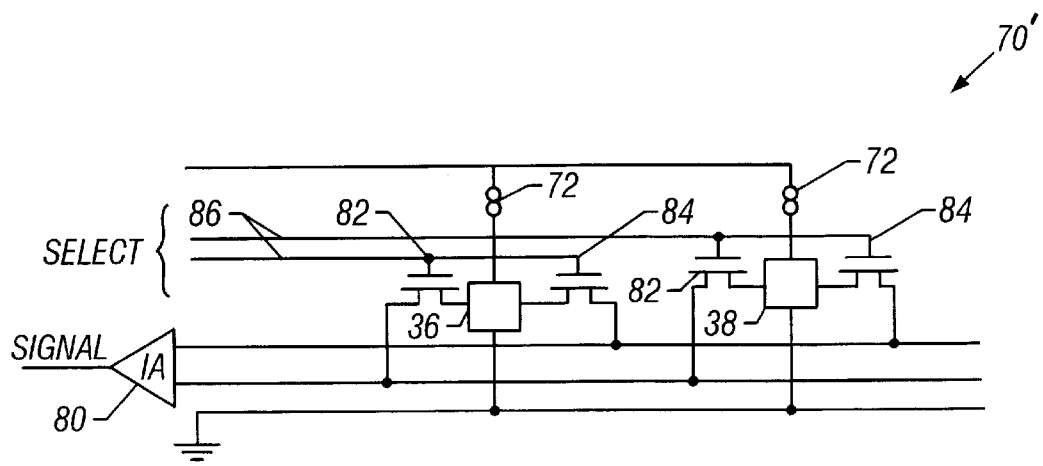

Alternatively, and as shown in FIG. 4B, a torsion sensor select circuit 70' includes a set of MOSFET or FET transistor switches 82, 84. In this arrangement, current sources 72 are always active, but the outputs of only one of the sensors 36, 38 are selected by activating the respective switches 82, 84 using a select signal on select line 86. In the exemplary torsion select circuits 70 and 70' of FIGS. 4A and 4B, respectively, the diodes or switches and connections may be integrated with the mirrors on the silicon substrate.

Figure 5A:
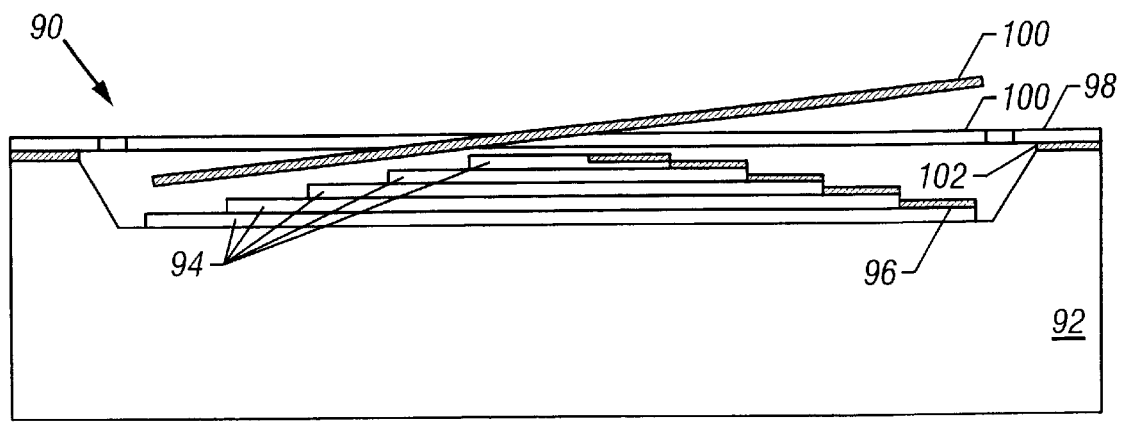
FIGS. 5A and 5B are side and plan views, respectively, of the micro-mirror structure having electrode structures integrated with mirrors using one layer of silicon-on-insulator.
Figure 5B:
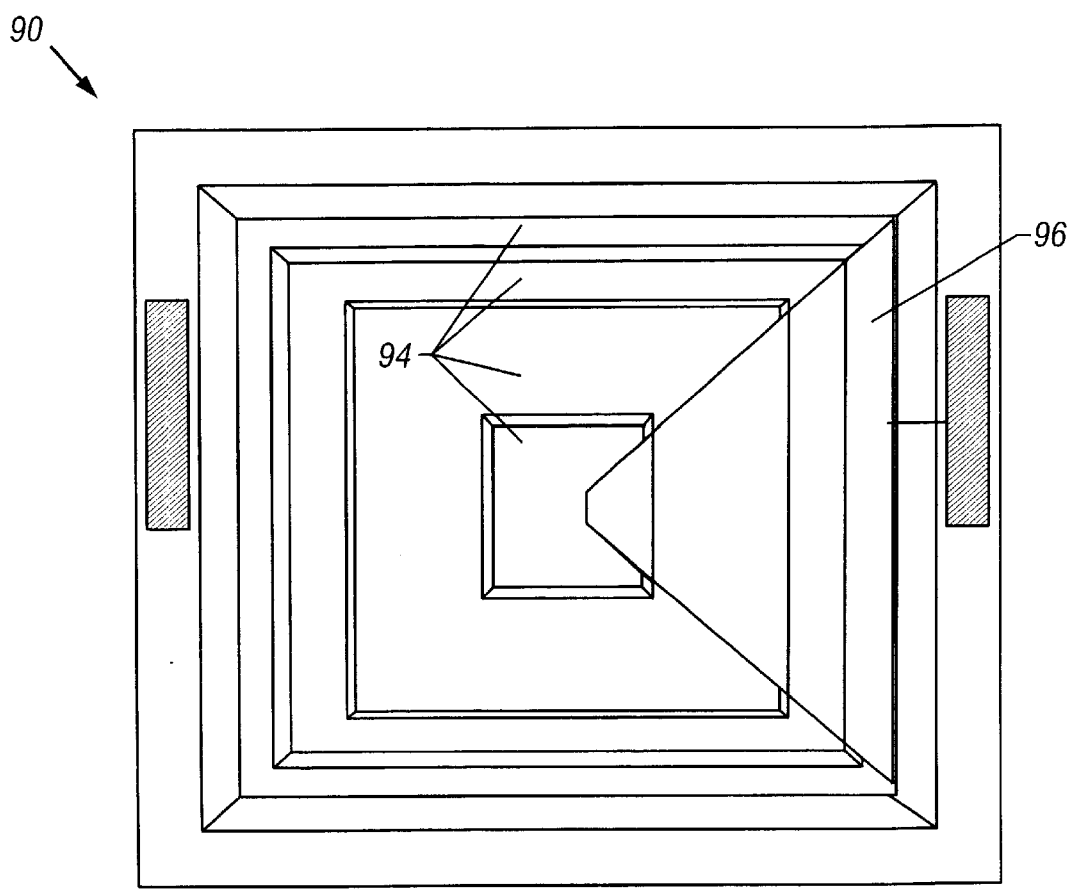

Referring to FIGS. 5A and 5B, a micro-mirror structure 90 disposed on a single silicon-on-insulator (SOI) structure is shown. The structure substrate is comprised of silicon. During fabrication of the structure, a wafer 92 is etched to various depths to provide the conical or quasi-conical form of the micro-mirror structure of FIG. 1A. The different masking steps 94 may be achieved by using either isotropic or anisotropic etching. After the definition of the electrode step geometry, the electrodes 96 are defined. The electrodes 96 may be made by junction isolation, or may be deposited on top of an insulating oxide or other insulators. The metal may comprise a suitable high temperature refractory type metal such as tungsten, or a metal silicide.

Referring to FIG. 5B, the electrodes 96 (of which only one is shown) can be arranged in a quad pair or as sets of separate x and y electrodes. Referring again to FIG. 5A, after completion of structures 94 and the placement of electrodes 96 thereon, a second wafer 98 is bonded to the wafer 92 by conventional wafer bonding techniques, or other suitable techniques. The second wafer 98 may also be an SOI wafer, preferably with the device side facing the wafer 92. The second wafer 98 is lapped down to a desired thickness. The sensors and the mirror patterns are defined by reactive ion etching. After the definition of the mirror (and torsion sensors) 100, a layer of a metal e.g., gold is evaporated to produce the mirror 100. It should be noted that an oxide layer 102 between the two wafers (layers) 90, 98 separates the mirror 100 from the structures of the underlying substrate, that is, the wafer 92.

Figure 6A:
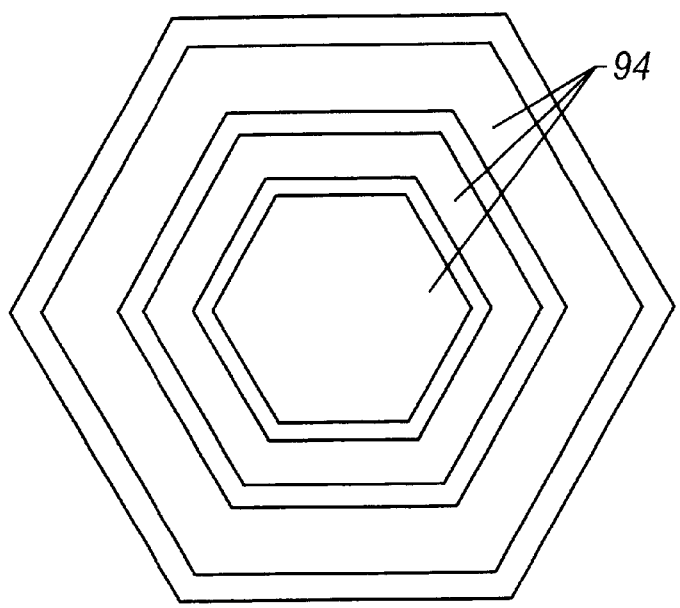
FIGS. 6A and 6B are depictions of different shapes of platform structures.
Figure 6B:
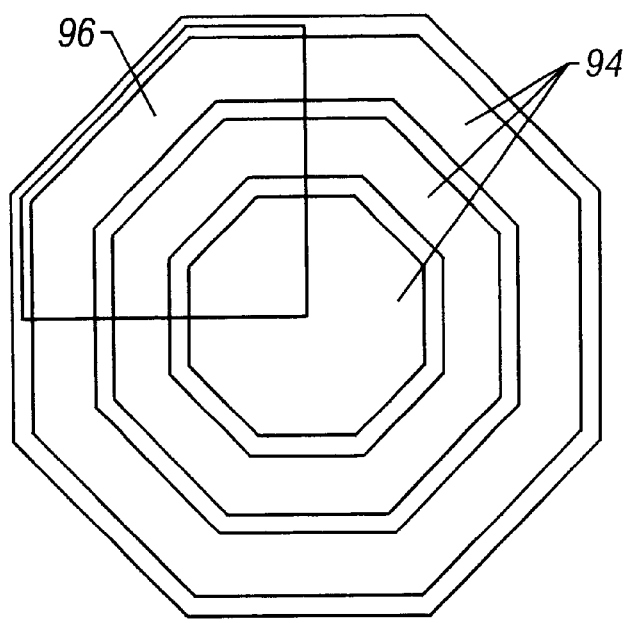

The term "pyramidal steps" as used herein refers to the steps 94 which give rise to a generally conical formation (which, as earlier noted, allows the mirror to pivot around two axes, i.e., two-dimensionally). For example, the steps 94 may be hexagonal or octagonal, or any shape that approaches a conical shape, e.g., the steps may be round circles rather than polygons. The steps (or platforms) 94 having polygonal shapes are shown in FIGS. 6A and 6B. FIG. 6A illustrates hexagonal shaped platforms 94. FIG. 6B illustrates octagonal shaped platforms 94. With such shapes, the electrodes and the mirror axes are preferably positioned so that the axes do not coincide with the vertices of the electrodes, thus minimizing vertex effects.

The required slope can be achieved by etching a number of steps of varying depth, providing a pyramidal arrangement that improves the deflection of the substrate and lowers the required voltage as described above.

Figure 7:
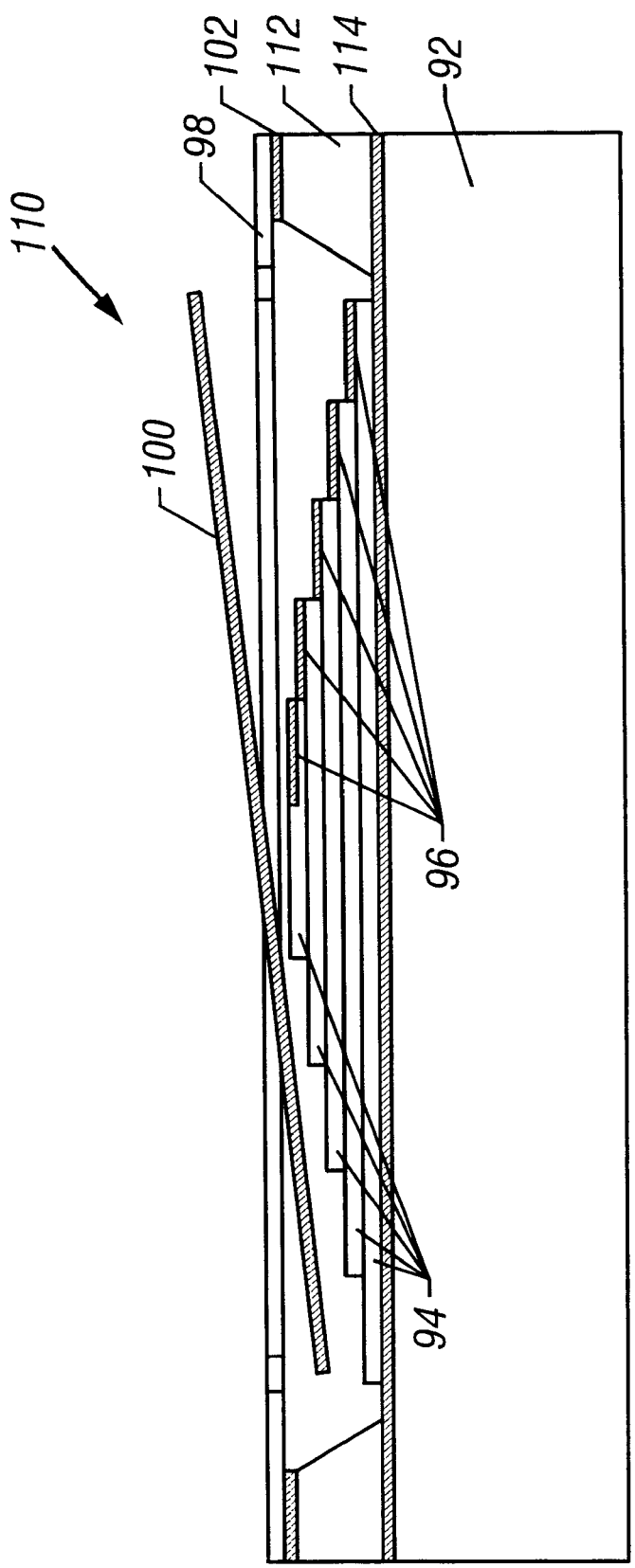
FIG. 7 is a cross-sectional side view of a micro-mirror structure fabricated with two layers of silicon-on-insulator.

Referring to FIG. 7, an alternative a micro-mirror structure 110 is constructed using a dual layer SOI structure. The steps 94 in the structure 110 are defined in an intermediate layer 112. The intermediate layer 112 is another SOI layer of a desired thickness. The electrodes 96 are defined and provided as described above with respect to FIG. 5A. In the dual layer SOI structure, there are two layers of oxide, a first oxide layer 102 and a second oxide layer 114, separating the various layers of silicon. After the formation of the steps 94 and the definition of the electrodes 96, the second wafer 98 is bonded to the intermediate layer 112 and wafer 92, and is then lapped down to the required mirror thickness, to form a top layer. Implantation and definition of the sensors, followed by reactive ion etching of the mirrors 100 and gold evaporation defines the mirror and its hinges.

Figure 8C:
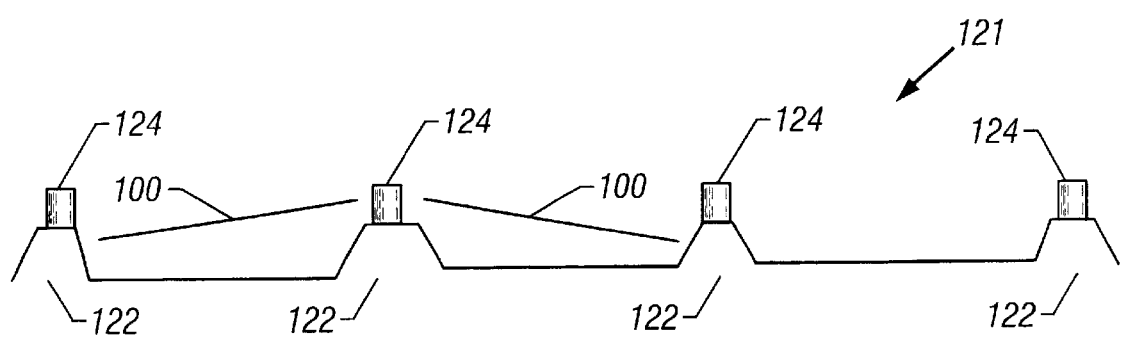

The fabrication techniques of FIGS. 5–7 allow for the incorporation of dams between adjacent mirrors to reduce interaction of viscous flow of one mirror with the adjacent mirrors, as will be described further with reference to FIGS. 8A–8C. Referring to FIG. 8A, in yet another depiction of a strip assembly 115 of micro-mirror structures, etching is performed to produce a single platform 94, either raised or recessed. A set of electrodes 96 (either a quad set as shown or separate sets of x and y electrodes) is diffused in the surface of that platform 94.

Referring to FIGS. 8A–8C, etching of one or more steps 94 in a silicon substrate provides a natural dam for blocking interaction between adjacent mirrors, either for pyramidal electrodes (as illustrated in FIG. 8B) or for the single cavity (as illustrated in FIG. 8A). The dam action is can be described with reference to FIG. 8C, which provides a length-wise, cross-sectional view of the strip assembly 121.

Referring to FIG. 8C, interaction between the mirrors 100 is almost completely blocked by dams 122. Additional blocking dams 124 formed above the silicon substrate (as illustrated in the figure) may be used. The increased height of the dam resulting from a combination of the dam 122 and the blocking dam 124 thus further improves isolation. The blocking dams 124 may be constructed using dry resist or Vacrel. Moreover, each blocking dam 124 may be made very narrow by etching with Reactive Ion Etching (RIE), leaving a high but thin structure of very high aspect ratio.

It is worth noting that the dams 122 (alone or in combination with the blocking dams 124) also serve to strengthen the already existing shield of driving fields in the electrodes regions as provided by the surrounding silicon. Thus, the dams 122 provide various types of isolation, including electrical.

In all of the structures of FIGS. 8A–8C, it is possible to integrate the driving amplifiers or torsion sensor amplifiers in one of the silicon layers that are present. It is also possible to further integrate the electronics of the micro-mirror structure by integrating current sources and sense amplifiers in the silicon next to the sensors, thereby greatly reducing the capacitive coupling to the driving leads.

Figure 9:
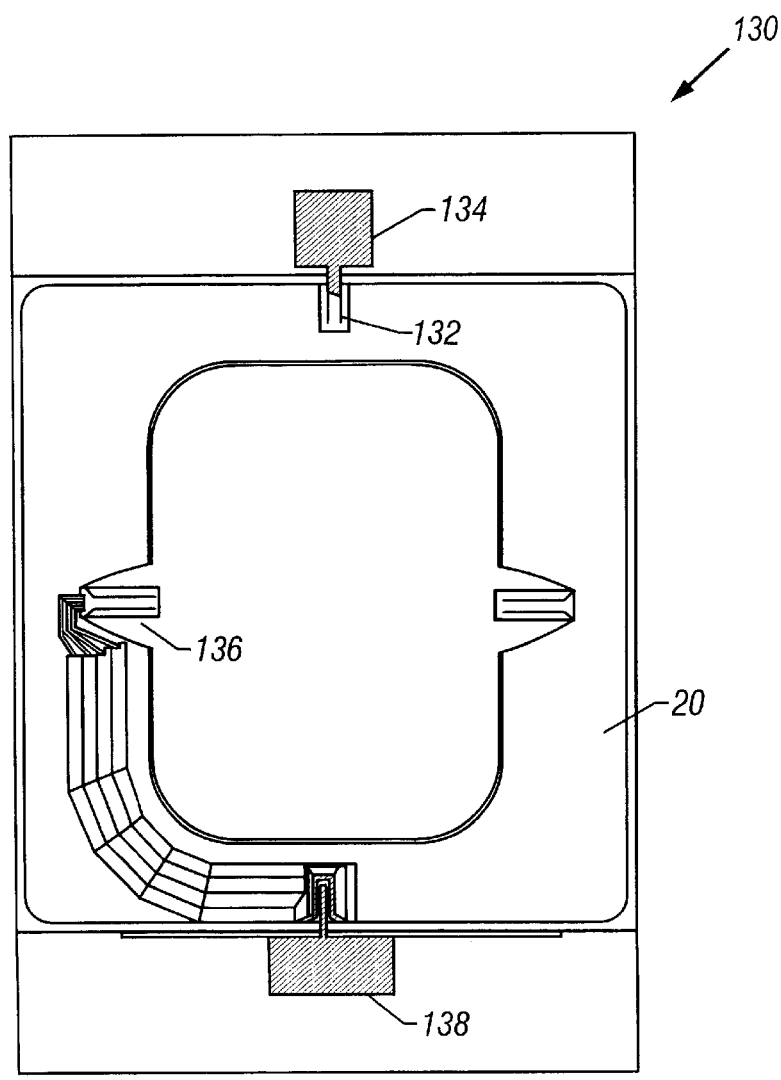
FIG. 9 is top view of a micro-mirror structure with integrated current sources and amplifiers.

Referring to FIG. 9, a micro-mirror structure with integrated current sources and sense (or instrumentation) amplifiers 130 is shown. In the structure 130, a first hinge sensor 132 has an adjacent sense amplifier and current source 134 attached, integrated into the substrate, and a second hinge sensor 136 has an sense amplifier and current source 138 attached, also integrated in the substrate. Alternatively, the sensor amplifier and current source 138 may be positioned closer to the hinge 136 by being made part of the frame 20 itself, as the frame 20 is made of single crystal silicon. Consequently, the sensor leads are much shorter and immediately buffered by the instrumentation amplifiers, thus greatly reducing the capacitive coupling.

Similarly, the electrostatic driver amplifiers for the electrode may be integrated in the top silicon layer, or in the substrate itself if the substrate is made from silicon.

Figure 10A:
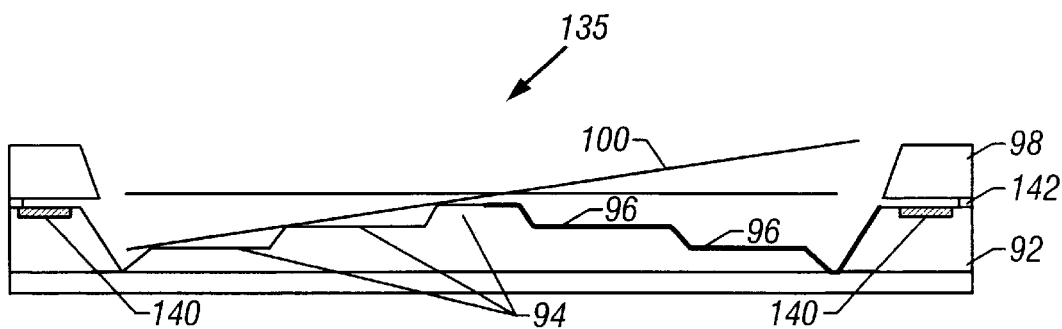
FIGS. 10A–10B are cross-sectional and top views, respectively, of a micro-mirror structure having drive amplifiers.
Figure 10B:
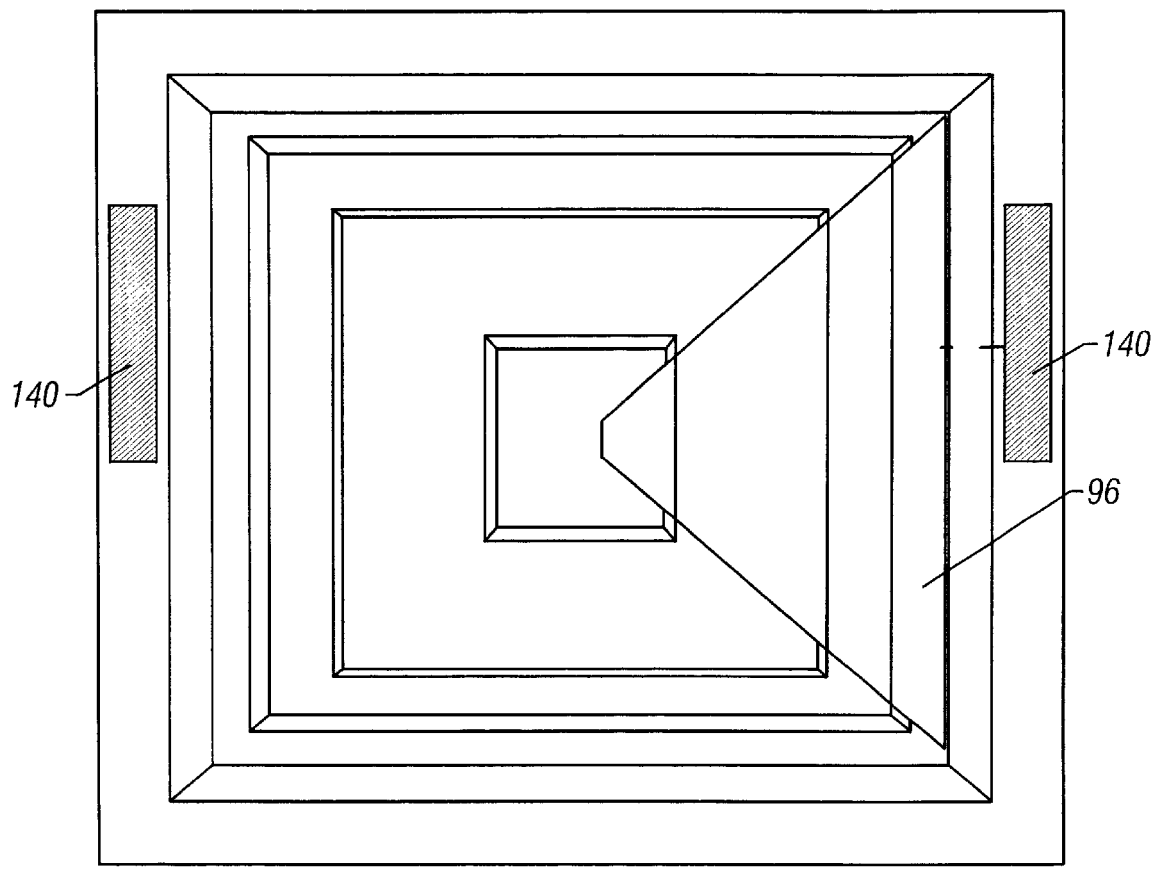

Referring the FIGS. 10A and 10B, a mirror structure having integrated driver amplifiers 135 is shown. In the mirror structure 135, the mirror 100 in the top silicon layer 98 is positioned above the substrate 92, which is also made out of silicon and which has steps 94 as earlier described. The electrodes 96 (of which only one is shown) are deposited on the substrate 92, and are driven by driving amplifiers 140 located in the silicon substrate 92. Spacers 142 separate the top silicon layer 98 from the substrate 92. Although not illustrated, the two silicon layers 92, 98 are connected with flip chip leads that connect the sensors or sense amplifiers to the underlying substrate 92. Thus, the sense amplifiers could also be located on the substrate 92.

Figure 11A:
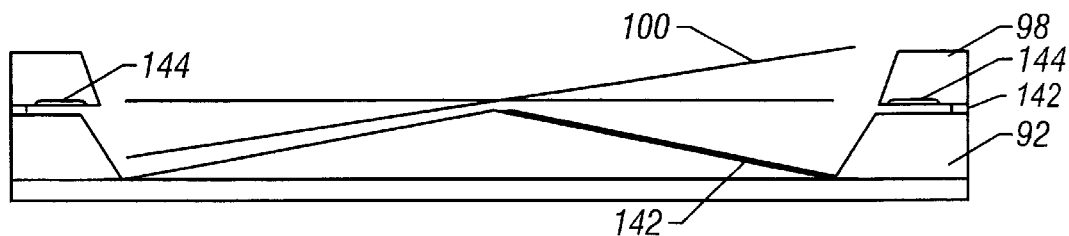
FIGS. 11A–11B are cross-sectional and top views, respectively, of a micro-mirror structure having drive amplifiers integrated with a substrate.
Figure 11B:
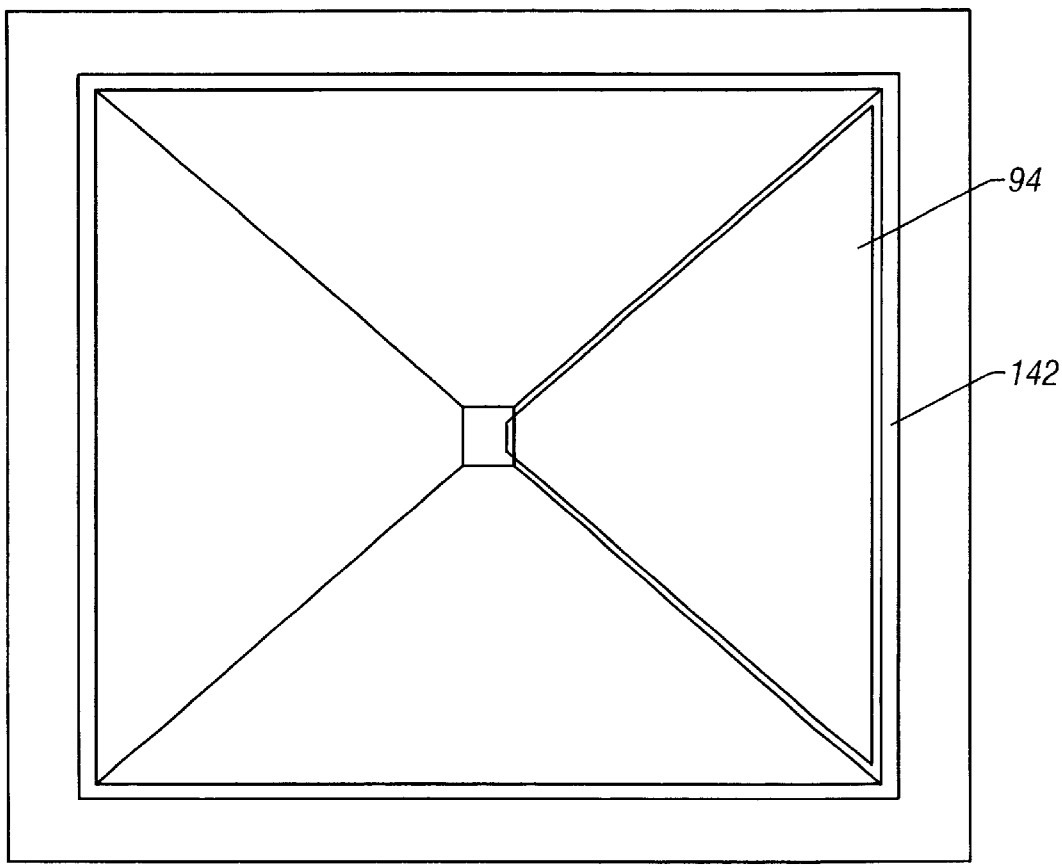

Alternatively, if the electrode drivers are integrated in the top silicon wafer, which incorporates the sensors and the sense amplifiers, the substrate itself may be made of ceramic. This type of structure is illustrated in FIGS. 11A and 11B.

Referring to FIG. 12A, the substrate 92 has a cone or pyramid 142 etched into it. A set of four electrodes 94 (only one is shown in FIG. 11B) are deposited on the cone 142. The driving amplifiers and sensing amplifiers, represented collectively by reference numeral 144, are now located on the top layer 98, which is mounted in flip-chip fashion to the underlying substrate 92.

With any of these arrangements, the number of leads needed for connections to external cables is substantially reduced. However, some of the electronic components, e.g., may be located on external boards along with other servo control devices. The location and partitioning of the various functions is based on the estimated reliability of each component, and possibly other factors e.g., cost.

A number of different devices may be used for the inner and outer torsion members 22a–b, 24a–b, respectively, from FIGS. 1, 2, 3A and 3C. For example, and as shown in some of those figures, the device may be a folded hinge such as a bifold hinge. An exemplary bifold hinge is described in PCT Application Ser. No. 99 21139 and U.S. Pat. No. 6,392,220, which is incorporated herein by reference.

Returning briefly to FIG. 3A, the torsion sensors 36 and 38 are positioned on the outside location of the hinge with which they are associated so that that hinge's leads do not need to be brought out over thin portions of the hinge. Such positioning on the inner hinges leads to a configuration in which the mechanical return of the hinge to the mirror is located away from the mirror. The resulting wide notch in the frame with the mechanical load of the electrostatic attraction tends to bend the outer frame 20, which is undesirable.

Figure 12:
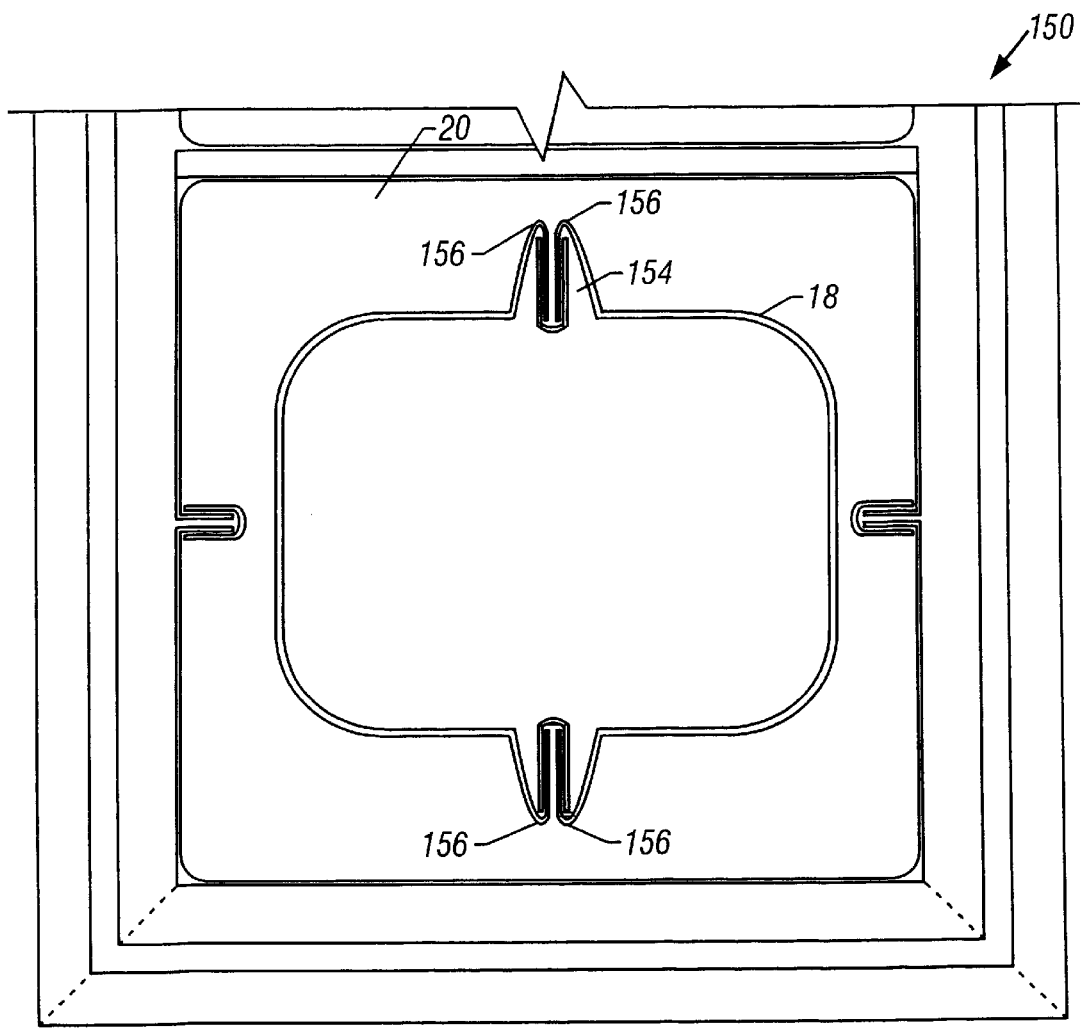
FIG. 12 is a top view of a mirror arrangement having inner torsion hinges with steep mechanical returns.

Referring to FIG. 12, a structure 150 using an alternative bifold hinge 154 that avoids the bending of the outer frame 20 under the electrostatic forces applied to both of the central mirror 18 and the outer frame 20 is shown. The bifold hinge 154 includes a mechanical return 156 that is formed to be very steep towards the mirror 18 while at the same time preserving the stiffness of the hinge. Bending that occurs will occur primarily in the hinge itself, and bending of the outer frame 20 is thus minimized.

Mode characteristics of the folded hinge can also be improved by tying various parts of the folded hinge together with another hinge having characteristics that differ from those of the folded hinge, as will be further described with reference to FIGS. 13A and 13B. This type of tying arrangement makes it possible to maintain a torsional constant without incurring a substantial increase in vertical stiffness.

Figure 13A:
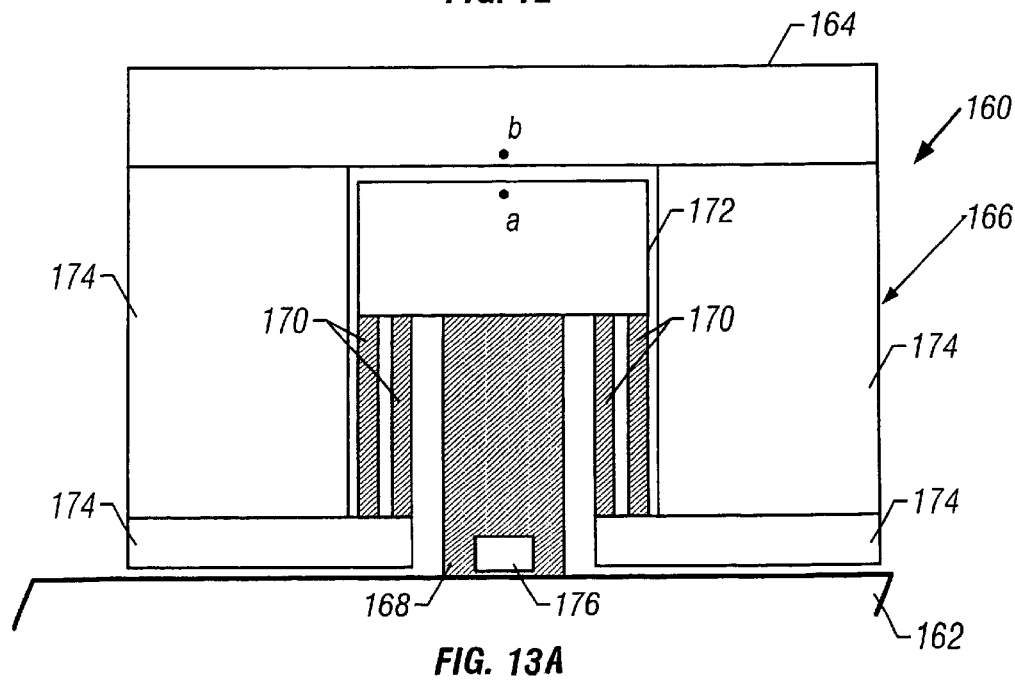
FIGS. 13A–13B are top views of bifold hinges.

Referring to FIG. 13A, an assembly 160 includes a fixed part 162 and a movable member 164, which are connected to one another by a folded hinge 166. The folded hinge 166 includes a first flexure 168 and second flexures 170, coupled by inner member 172 and outer members 174, which may be completely stiff. Optionally, the assembly may further include a torsion sensor 176 to measure the deflection of the rotating hinge. Because the hinge 166 is folded, it takes up much less space. In addition, the hinge 166 has virtually the same torsional constant as it would if members 170 and 176 were linearly connected (without folding). The vertical stiffness may be enhanced by as much as a factor of 4 because the length (as compared to an unfolded hinge) is reduced in half, which would increase the vertical spring constant by a factor of 8. At the same time, however, there are two springs in parallel, which provides in total stiffness improvement so a factor of 4 (and hence a doubling of the vertical resonance frequency). The hinge of FIG. 13A as described thus far is similar to that described in U.S. Pat. No. 6,392,220.

It is understood that if points "a" and "b" are linked so that they rotate freely, but are constrained from moving vertically with respect to each other, then the vertical stiffness would be further improved by a factor of 2. This would require an ideally flexible spring, but a good approximation can be obtained by using a folded flexure hinge in its place. It is, of course, possible to put a simple flexure in place, but a folded hinge has better characteristics. It is desirable to provide a hinge that is very flexible in rotation, but stiff in vertical bending (the lateral modes are usually of less importance as they are generally not excited by the driving mechanisms).

It turns out that the characteristic for torsion allows such hinges. By making the width of the hinge narrow, thinner than the thickness, it now becomes very flexible in torsion. By making it short, it can be made vertically very stiff even if the width is reduced. The vertical stiffness decreases as the third power of the length, whereas the vertical stiffness only decreases linearly with width. The torsional stiffness, however, decreases as the third power of the width of the ribbon, when the width is smaller than the thickness. Hence, this indicates that the width should be smaller than the thickness.

Figure 13B:
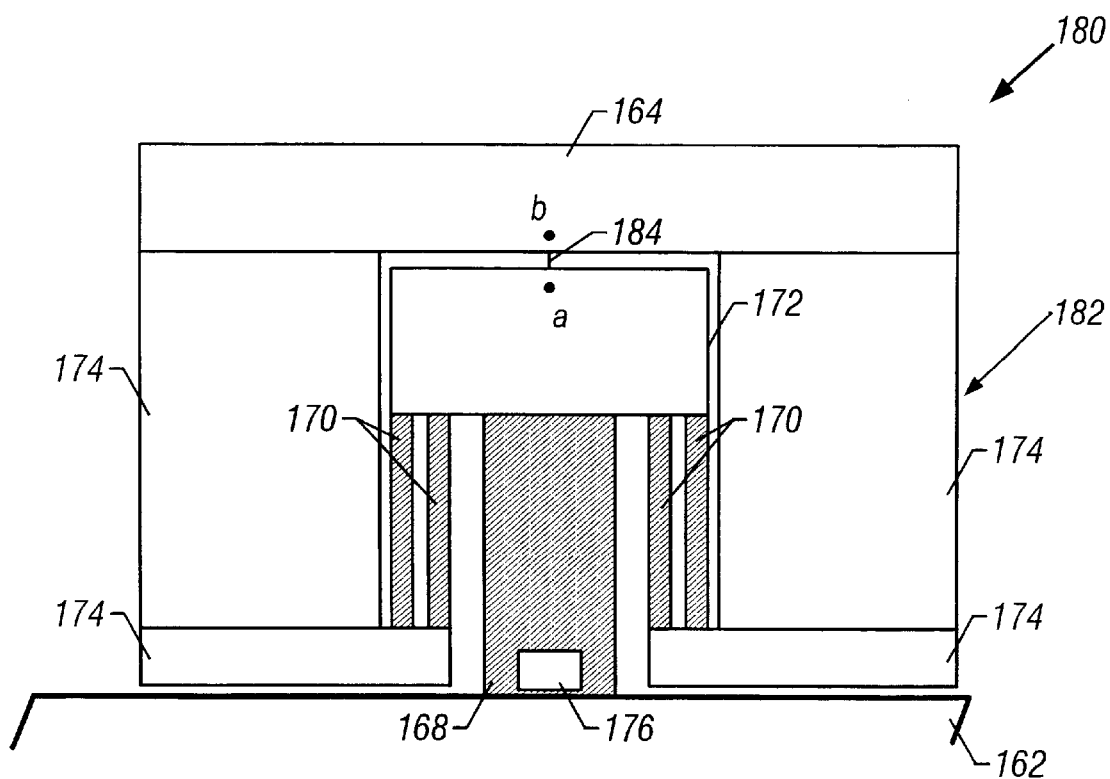

Referring to FIG. 13B, an assembly 180 includes a folded hinge 182 having points a and b connected with simple, flexure hinge 184. The flexure hinge 184 may be very narrow and slender, but quite long, thus giving a very low torsion constant as well as very good vertical stiffness. The hinge 184 may extend partially into supports 172 and 164 for greater length and hence more flexibility without affecting the operation of the assembly. Flexure hinge 184 may be replaced by a composite hinge such as the one illustrated in FIG. 13A.

It is highly desirable to have a micromachined flexible hinge that is very short but still has very high torsional flexibility. Also it is extremely desirable to maintain torsional flexibility while maintaining high vertical and lateral stiffness of the hinge. Folded hinges provide one way of achieving this goal. A different option is discussed below, with reference to FIGS. 14A–14C.

Figure 14A:
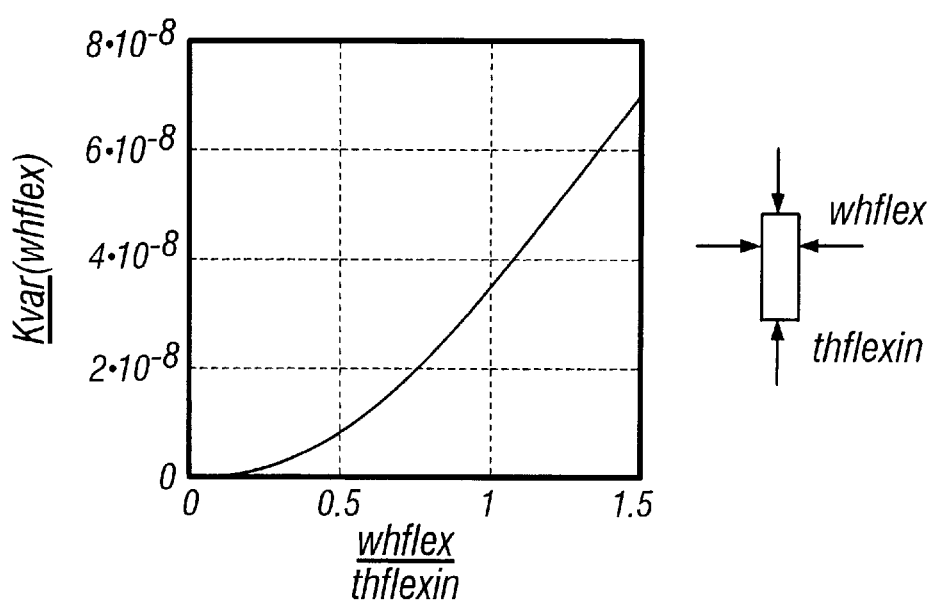
FIG. 14A is a graph of torsional constant versus aspect ratio

Referring to FIG. 14A, a graph of the torsional constant of a torsion bar for varying width to height aspect ratios is shown. The graph illustrates the variation of the torsion spring constant with varying width to height ratios. For a rectangular cross-section hinge, with a variable aspect ratio as illustrated, the torsional constant of the hinge increases almost linearly with the width when the width to aspect ratio is greater than one and decreases approximately as the third-power of the width below that.

Figure 14B:
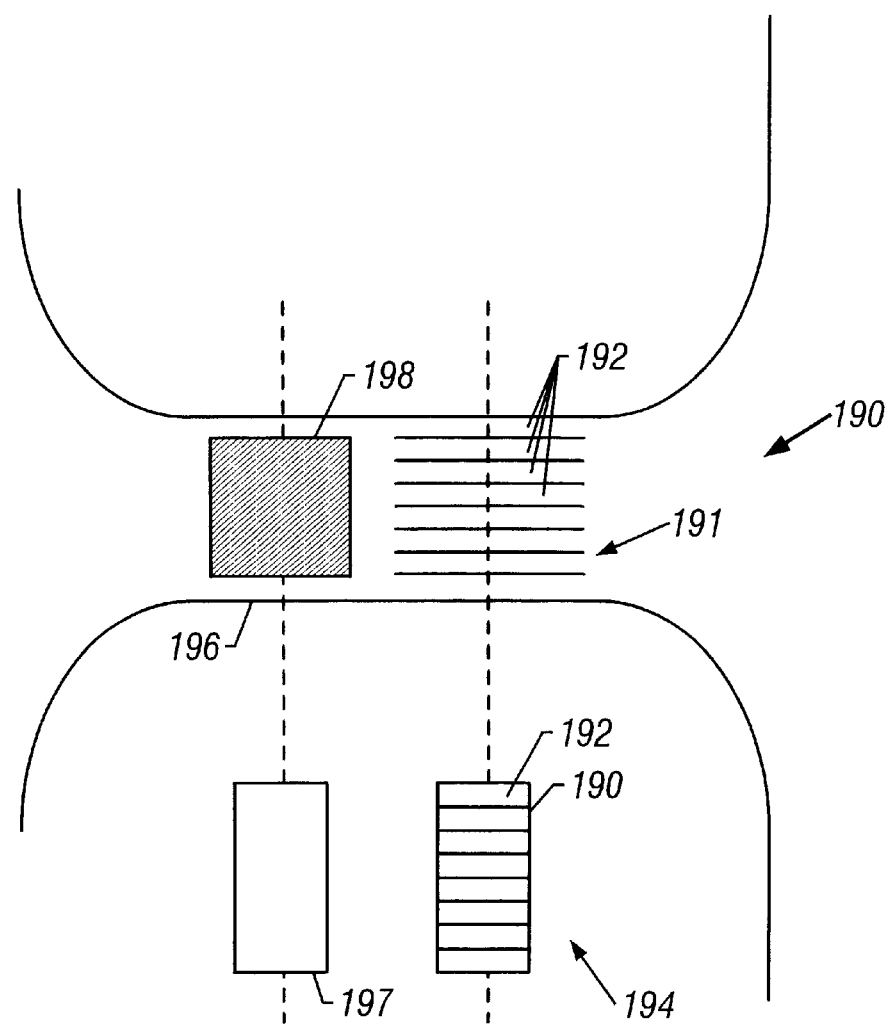
FIGS. 14B and 14C are views of a micromachined hinge having vertical slots to reduce length while maintaining its torsional constant (FIG. 14B) and a detailed view of the slots (FIG. 14C), respectively.
Figure 14C:
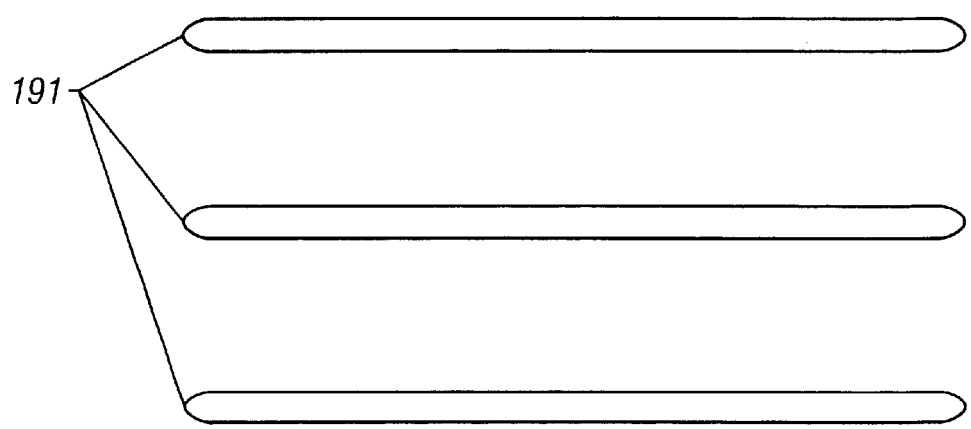

Referring to FIGS. 14B and 14C, consider now a slotted hinge 190. The slotted hinge 190 includes narrow verticals slots 191 (three being shown in greater detail in FIG. 14C), cut in the silicon hinge 190 all the way through as indicated and as shown in the cross-section 194. The net result is to form a set of hinges 192 which are all in parallel, and each individual hinge 192 having a much lower torque-constant than the original undivided hinge. For example, each hinge 190 which has an aspect ratio w/t of 2 to start with is divided into 8 parts by slotting, and each of the sub-hinges 192 has an aspect ratio ¼ The torsional stiffness of each of the sub-hinges 192 per unit length is reduced by a factor of almost 100, although 8 of them are placed in parallel. Thus, a dramatic reduction in hinge stiffness can be achieved in this manner. Micromachined hinges of this type may be readily fabricated by deep reactive ion etching using the Bosch or any other process which is capable of making very narrow grooves of very high aspect ratio. Hence, the hinge is masked off with oxide or any suitable mask, and the vertical slots are simply etched through the full thickness. Other etching methods may also be used. The hinge material may be silicon, polysilicon or any suitable oxide nitride, metal or any material used in silicon device fabrication. The length of the slot may be tailored to give the desired torque characteristic. Of course, it is desirable for the slots 191 to be spaced as close together as possible. Hinges 192 may all be interconnected with a section 196 which as seen in the cross-section 197 has no slits. The hinge 190 may include a torsion sensor 198 (bridge or four terminal), could be implemented without the torsion sensor 198 as well.

Such hinges maintain the vertical and lateral stiffness that is desired. It is clear by inspection that the vertical bending moment has been nearly fully maintained since the beams add simply in parallel in that direction. At the same time, their length has been drastically reduced, which increases the spring constant as the inverse third power of their length. The lateral bending moment has in this case been reduced by a factor of 64 due to the sectioning, but the reduction in length compensates greatly for this decrease. Generally, the lateral stiffness is somewhat less important than the vertical stiffness, and given the dimensions of the hinge that are typically involved, it is substantially larger than the vertical stiffness to start with. Therefore, a hinge having sections which are very narrow (like hinge 190 of FIG. 14B) may have the same torsional constant as one that has many times its length, and its vertically and laterally much stiffer.

Figure 15A:
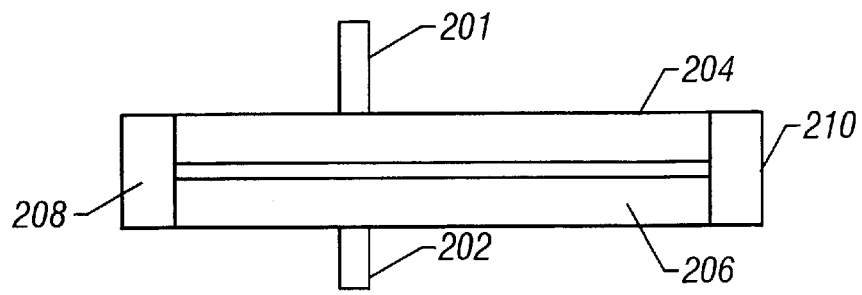
FIGS. 15A–15D are illustrations of meander type hinges with high vertical stiffness.

Referring now to FIG. 15A, a meander-type hinge 200 includes torsion hinges 201 and 202, which are connected by bands (springs) 204 and 206. In some instances, it may be desirable for a micro-machined hinge to provide design flexibility in a physical direction that is different from the torsion hinge. The bands 204 and 206 are connected with ends 208 and 210. In such an arrangement, it is important to keep the ends 208 and 210 tied together vertically to hold the vertical deflections to a minimum and maximize vertical stiffness.

Figure 15B:
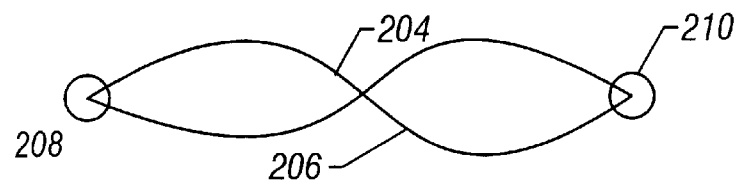

As illustrated in FIG. 15B, under torsional load, both springs 204 and 206 deform and their ends are tilted with respect to each other. If the ends 208 and 210 are tied together by a simple plate, then the torsional spring constant is increased by almost a factor of 3. Hence, it is desirable to let the ends of springs 204 and 206 rotate with respect to each other, while typing them together vertically.

Figure 15C:
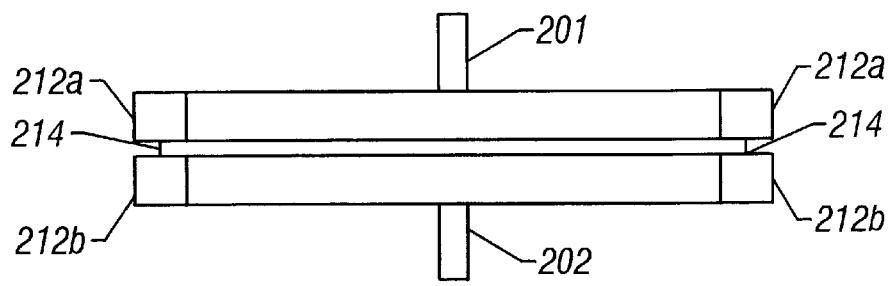
Figure 15D:
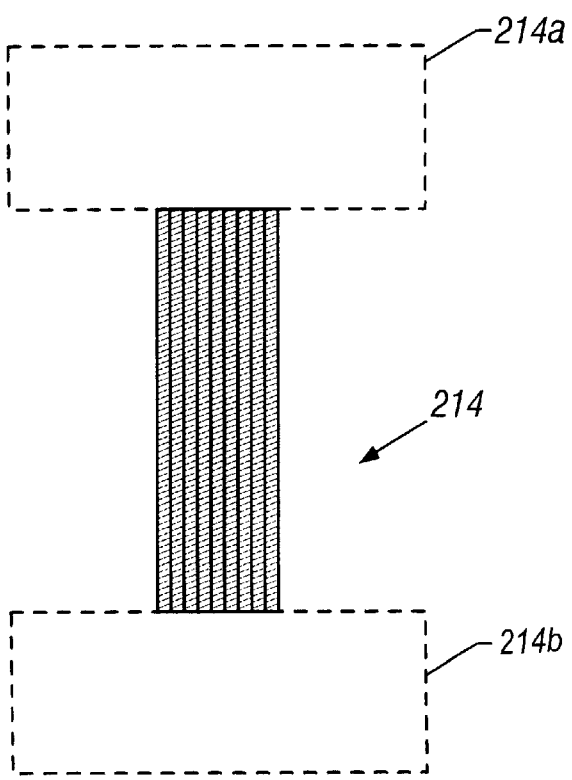

Referring to FIG. 15C, the ends of the springs 204 and 206, shown as ends 212a and 212b, respectively, are connected by a torsion hinge 214, which is very flexible rotationally, but vertically stiff. Preferably, the torsion hinge 214 is of the serrated type, as illustrated in FIG. 15D and described above with respect to FIG. 14B, which is very flexible but has high vertical stiffness.

Alternatively, it may be of the folded hinge type, as illustrated in FIGS. 13A–B and described in the above-referenced PCT Application Ser. No. 99 21139 and U.S. Pat. No. 6,392,220. Any hinge that has good vertical stiffness and good torsional flexibility may be used for hinge 214.

For large mirrors, it is important that the mirror be very flat, and hence it should be made of an SOI silicon plate that is as thick as possible. The hinges, made from the silicon layer, need to be very flexible and may be much thinner than the mirror. The mirror frame should be as sturdy as possible. These different thickness requirements make it difficult to do the lithography for sensors on hinges when there are large depth differences. Thus, it is suggested that up to three different thicknesses be used to fabricate the scanner. These thicknesses may all be made by timed anisotropic etching from the front, leaving the mirror surface intact. A technique for two different thicknesses is described in U.S. Pat. No. 6,445,844, incorporated herein by reference.

Figure 16:
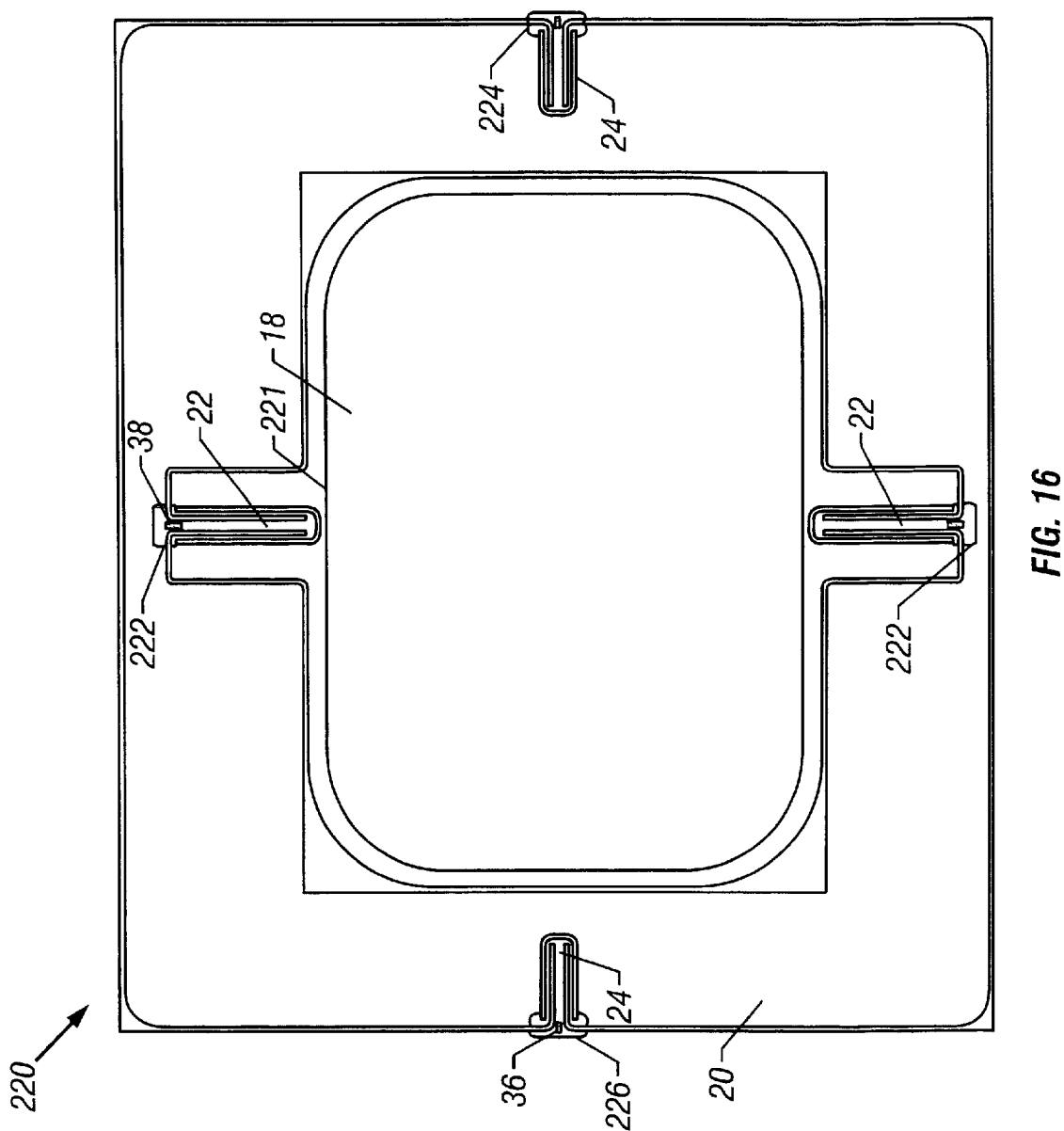
FIG. 16 is a plan view of a micro-mirror structure in which the mirrors have one thickness and the hinges have a different thickness.

Referring to FIG. 16, in the micro-mirror assembly 12 (again, shown in partial view for purposes of simplification) the mirror 18 may be made of one thickness, e.g., 15 micron; the hinges 22 and 24 can be made of a different thickness, e.g., 7 micron, which may produce a large step at the intersections 220 of the hinges 22, 24 and the mirror plate 18, but no sensor leads need to be bought out over this step on the inner hinge 22. The outer frame 20 may be made, e.g., out of 10 micron, such that it has sufficient stiffness. At location 222, where the leads for the inner sensor 36 need to be brought out, there is only a 3 micron step, which is relatively easy to bridge. In fact, if the outer frame 20 is made of the same thickness as the hinge 22, then there is no step at all.

Likewise, a step occurring at location 224 near the outer hinge 24 is relatively small, and is easily crossed. At location 226, near the sensor 36, there is usually a return to the full plate thickness, but the leads in this area can be far spread out so that only thick lines have to go across the step.

To reduce the inertia of the mirror 18, it is possible to make the frame 20, e.g., 15 micron thick, while making the mirror 18 only 7 micron thick. This is similar to the etched frame described in U.S. Pat. No. 5,629,790. All of these structures can be made of SOI silicon as described above or polysilicon, which has been etched from the top surface.

Figure 17A:
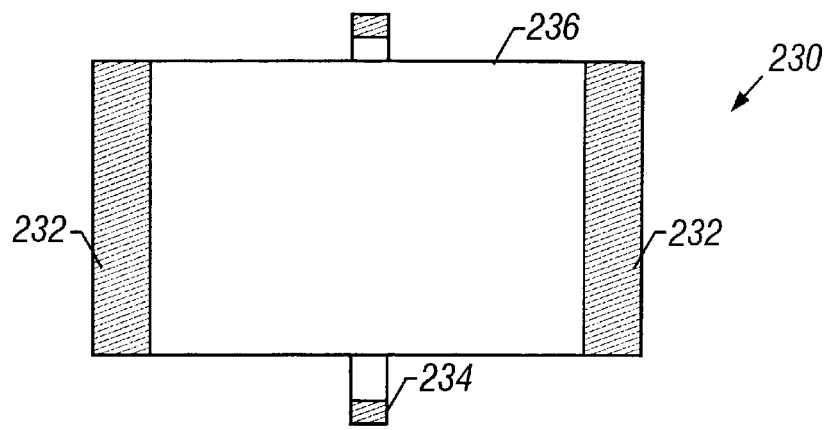
FIGS. 17A–17D are top views of shear sensor implementations.

Referring to FIG. 17A, a shear sensor 230 integrated in a torsion hinge is shown. A current sent through current contacts 232 produces a differential signal on the sensing electrodes 234 in an implant region 236 when shear is applied in the plane of the sensor 230. The ratio of the width of the current contacts 232 to the length of the sensor is usually between 0.8 and 2. A vertical offset in the mask for the current contacts 232 produces an offset voltage on the electrodes 234. The offset voltage is defined as the sensor output for a given current when there is no stress to the transducer.

Figure 17B:
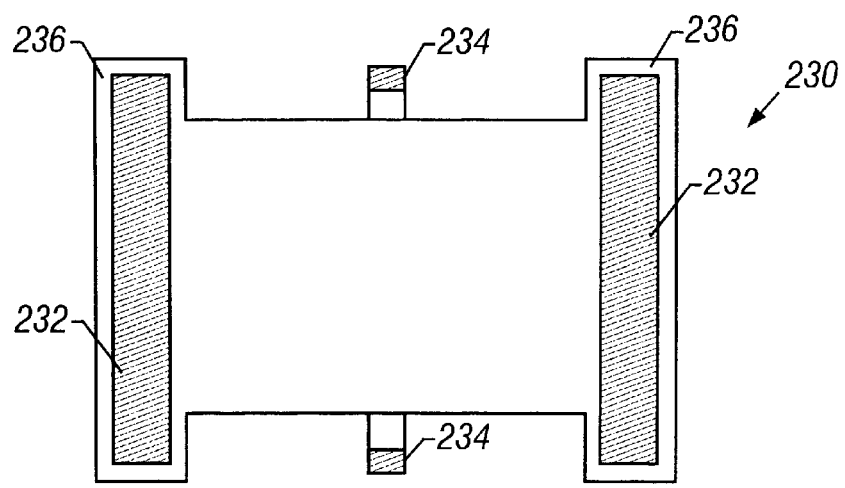

Referring to FIG. 17B, the current contact 232 is widened and is wider than the current path in the sensor proper; any vertical or even horizontal misregistration now has very little effect on the sensor output and hence on the offset of the sensor. Current contacts 232 are located inside the recesses 236 of the implant region 236 that defines the sensor 230. The widened contact also lowers the required current density on the electrodes 234, which in turn makes current density more uniform. Current non-uniformities in the contacts caused by local effects tend to be evened out with this arrangement.

Figure 17C:
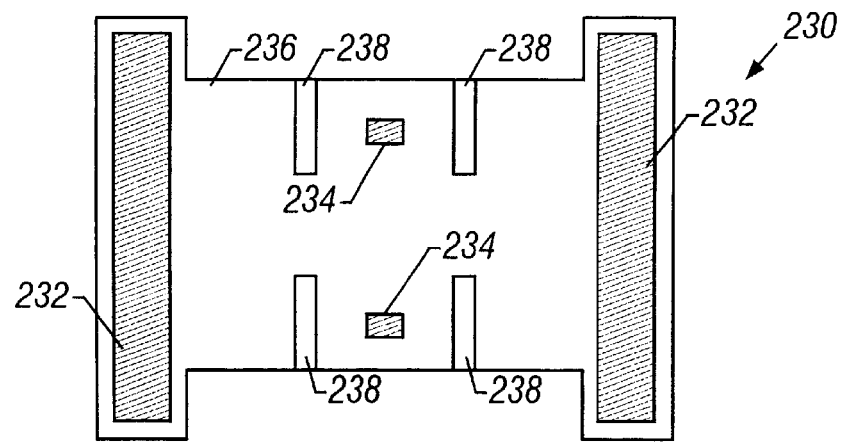

With reference to FIG. 17C, to further improve the shear sensor and its offset, insulating dams 238 are placed in the implant region 236, as is sometimes done for Hall effect devices. The insulating dams 238 produce a restriction of the current (with a subsequent expansion) and eliminate much of the discontinuities since the current is now almost fully lithographically defined. The insulating dams 238 are used to constrict the current from electrodes 234 in the implant region 236.

The insulating dams mechanism described above in reference to FIG. 17C is a measure that may be taken to decrease the offset voltage between the sensor electrodes 234. However, in some cases, it may be desirable to produce a unipolar offset which is well calibrated on top of the random offset that is caused by the remaining uncontrolled non-uniformities and lithographic misregistrations.

Figure 17D:
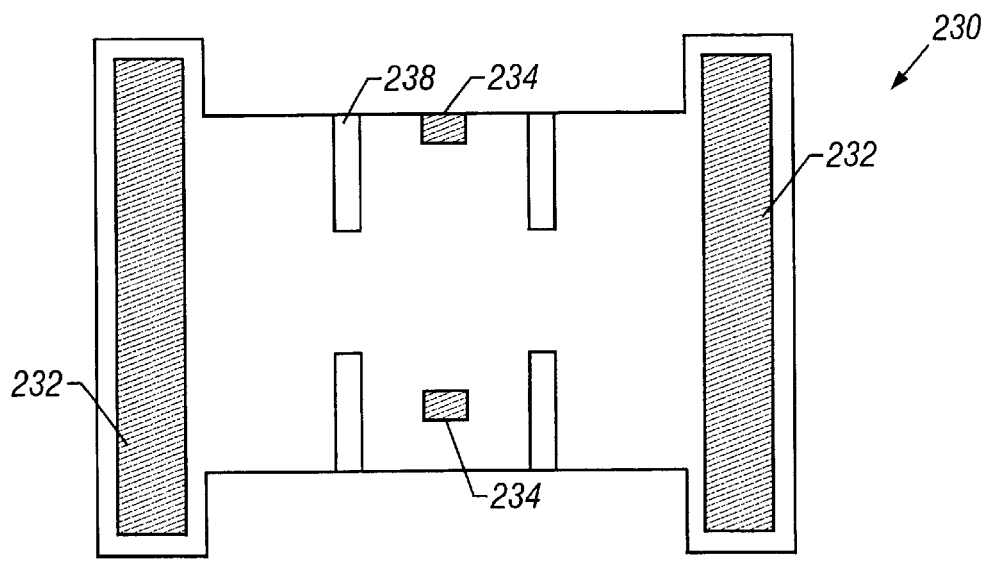

Referring to FIG. 17D, the electrodes 234 are deliberately offset in a vertical direction, thus producing a known offset voltage. Consequently, the output of the sensor is always biased to one side, a result that may be desirable for some calibration procedures. The offset may also be produced by a lateral displacement of the electrodes 234.

Figure 18A:
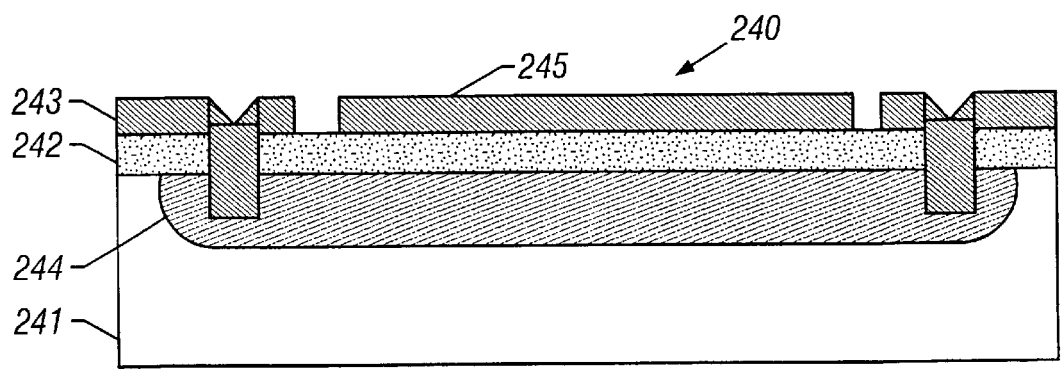
FIGS. 18A–18C are different views of a portion of a micro-mirror structure having a sensor shield layer.

Referring to FIG. 18A, a shielded sensor structure 240 is shown. The structure 240 includes a silicon layer 241, an insulating layer 242, a metal layer 243. The structure further includes a sensor implant resistor 244 in the silicon layer 241 that is coupled to the metal layer 243 and a shield 245 that is applied over the sensor implant resistor 244 to stabilize sensor output and eliminate light sensitivity. While silicon is normally not sensitive to light in the telecom transmission region (wavelength >1.3 micron), during alignment if visible or near visible light is used, it is possible to induce small transients in the sensor. These small transients may give rise to erroneous calibration. The shield 245, together with the insulating layer 242 (a layer of oxide, nitride or oxy-nitride), provides a substantial protection against drift or source contamination, and also protects to some degree against the driving electrostatic field.

Figure 18B:
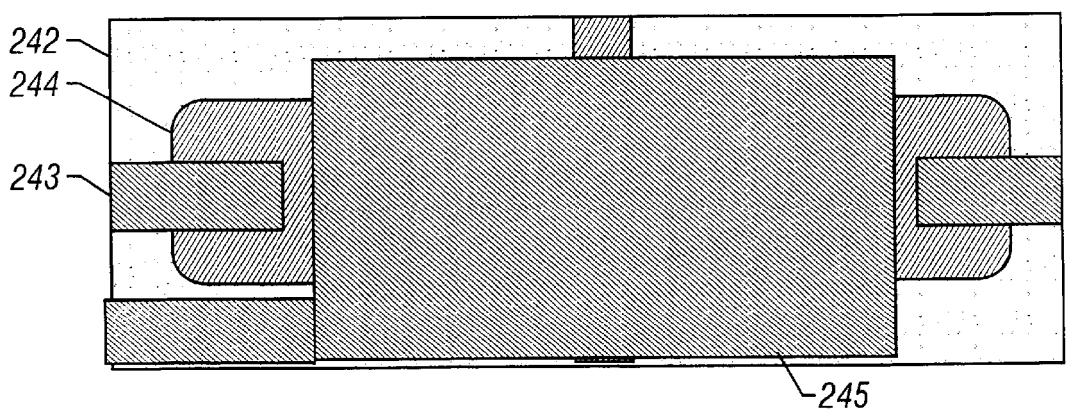

FIG. 18B provides a top view of the sensor structure 240. As shown, the shield 240 may be tied to ground (e.g., on one end of the current source) or to a fixed potential.

Figure 18C:
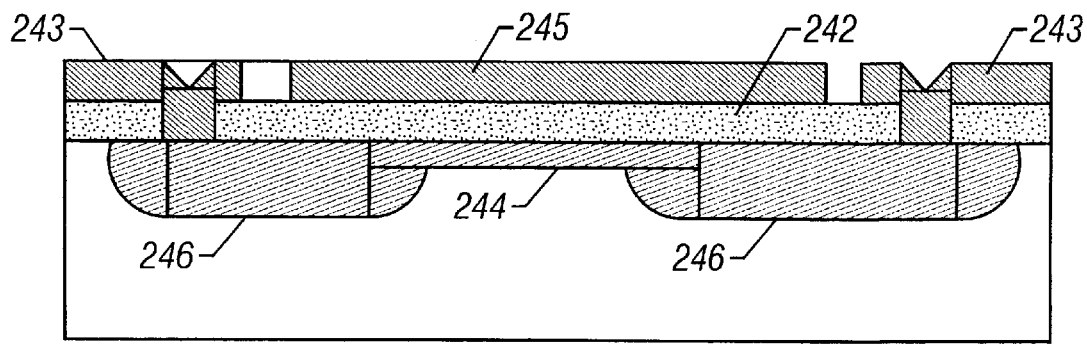

Referring to FIG. 18C, in an alternative arrangement, the shield 240 can cover the sensor implant resistor 244 completely. The contacts for the sensor implant resistor 244 are made through highly doped implant contact regions 246.

Figure 19:
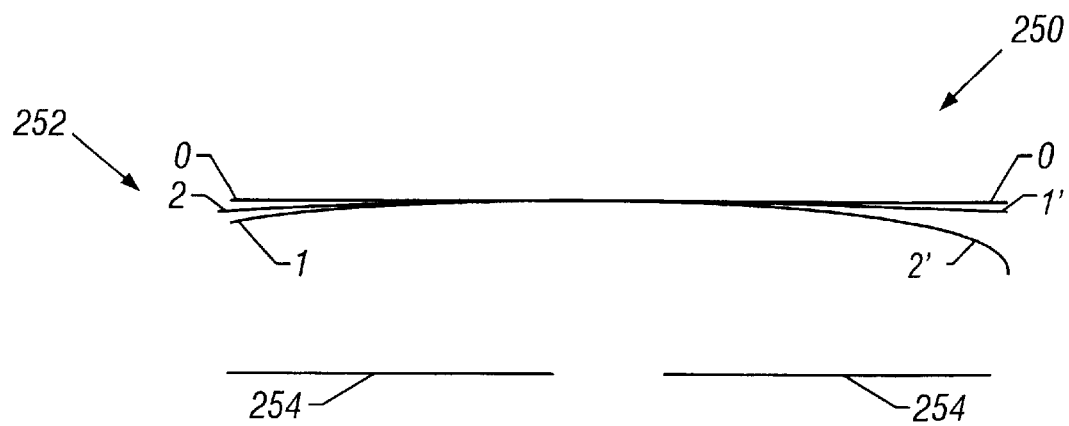
FIG. 19 is a depiction of curvature of a mirror due to electrostatic forces.

Referring to FIG. 19, mirror curvature as a function of loading 250 is shown. It is recognized that thin electrostatic mirrors may bend under the forces of the electrostatic field that is used, particularly in the mirrors are very large. A mirror 252 in a rest position (indicated by line 0–0') is capable of bending towards electrodes 254 under the electrostatic forces. When the same voltage bias is applied to both of the electrodes 254, the deflection may be moderate, as illustrated by the curve 1–1' (e.g., a fraction of 1/10 micron). When the mirror gets deflected, the load is increased on one side and decreased on the other, but the net effect is that the average bending is increased, as illustrated by curve 2–2'. This curvature of the electrostatic mirrors, which produces some optical power in the beam, may be included in the calculation of the optical path which the beam traverses. By including an average deflection for the mirror, rather than assuming that the mirror is flat, the effect of this bending is much reduced. This bending may occur in one or two dimensions. Compensation for the dynamic deflection that occurs can be substantially improved by assuming an average mirror deformation, about which the mirror deforms dynamically in opposite directions depending upon the amount that the beam is tilted.

Figure 20:
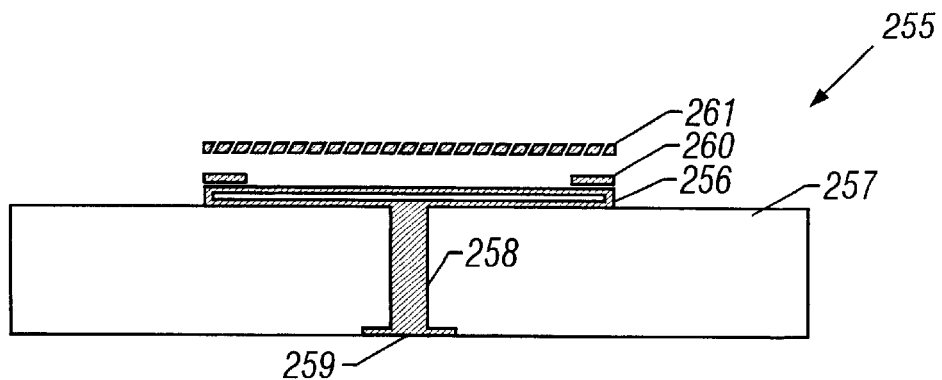
FIG. 20 is a cross-sectional side view of an electrode/substrate structure having a resistive material to minimize mirror arcing.

Referring to FIG. 20, a structure 255 having highly resistive electrodes 256 is shown. The structure 255 includes an electrode 256, positioned on top of a substrate 257, connected through a via 258 to a driver lead 259. The electrode can be made highly resistive using a material such as a highly resistive polysilicon or other suitable materials. An insulating layer 260 is applied in selected regions at the edges of the electrode 256 to protect the electrode 256 from direct contact with a scanning mirror 261 (shown in dashed lines), which is often at ground. Thus, with this implementation, no other series resistors are needed, as the highly resistive electrode is serving as a resistor. Preferably, resistivity should be selected in the range of 100 Kohm to 50 Kohm/square such that the dielectric relaxation constant is still small compared to the switching times involved.

Referring to FIG. 21A, a micro-mirror strip assembly 270 having a dense array of two-dimensional scanners 272 is shown. The scanners 272 are mounted in an outer frame 274 that sits on a substrate 276. Each of the scanners 272 includes a mirror arrangement such as the mirror arrangement 14 from FIG. 1. That is, each scanner 272 includes the mirror 18 and the mirror frame 20 for deflection in two dimensions around the hinges 22 and 24, as earlier described. Each scanner 272 is aligned with adjacent scanners along the outer frame 274 for a dense arrangement. When the mirror frame 20 is deflected fast, it exerts a force on adjacent scanners 272 through viscous interaction with the ambient gas in which the mirrors reside.

Figure 21C:
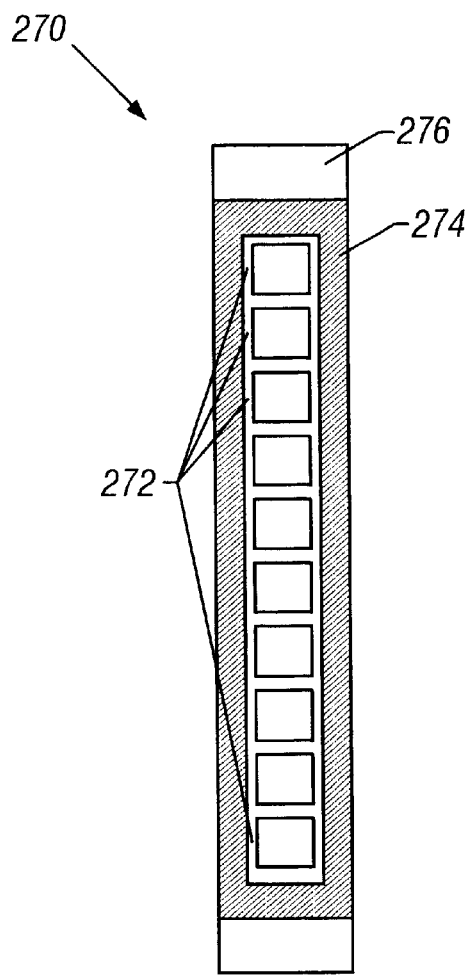
Figure 21C:
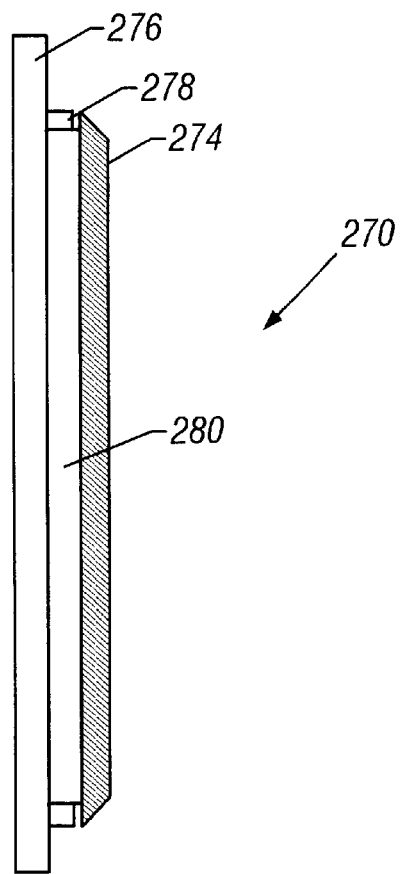
Figure 21C:
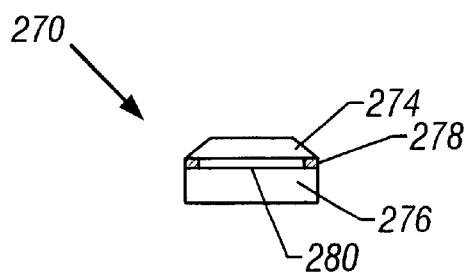

Referring to FIGS. 21B and 21C, the outer frame 274 is spaced a small distance away from the substrate 276 with a precision spacer 278. Since the precision spacer 278 usually runs the full length of the assembly 270, the air underneath is confined to a small, almost closed channel 280 in between the outer frame 274 and the underlying substrate 276. Therefore, there is little room for a pressure wave generated by the movement of the frame 20 to escape, and it tends to couple predominantly to the frames 20 of the adjacent scanners. There is very little if no interaction by the movement of the mirrors 18 around their inner axes because they are so far apart.

There are various way's in which the interaction between the frames 20 can be minimized. One way is to space apart the scanners 272 by a distance at least three times the height of the spacer 278. Another way to reduce interaction is by using gases in the operating environment that have either low viscosity, or low density such as helium. In a high vacuum, there is no interaction.

Figure 22A:
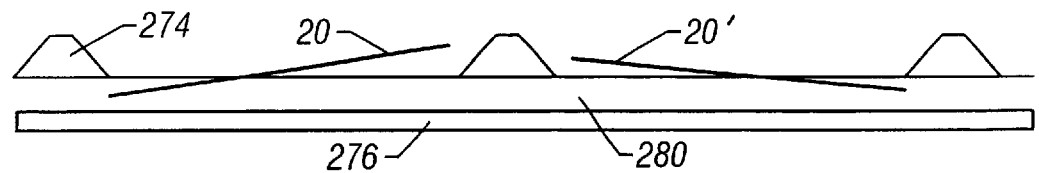
FIGS. 22A–22E are illustrations of dams used in the two dimensional mirror arrays to prevent interaction between the mirrors.
Figure 22B:
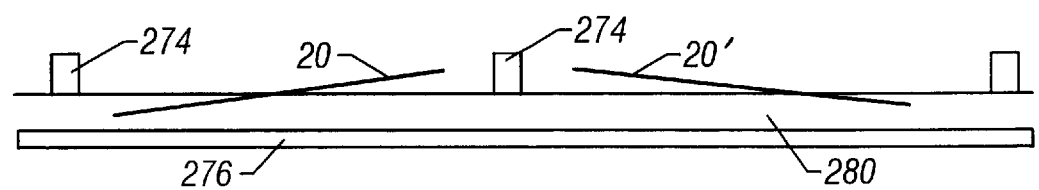
Figure 22C:
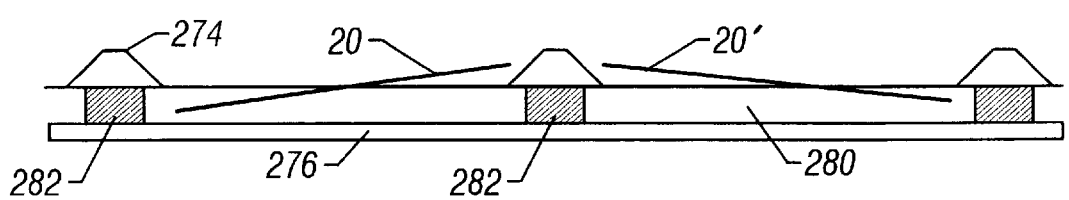
Figure 22D:
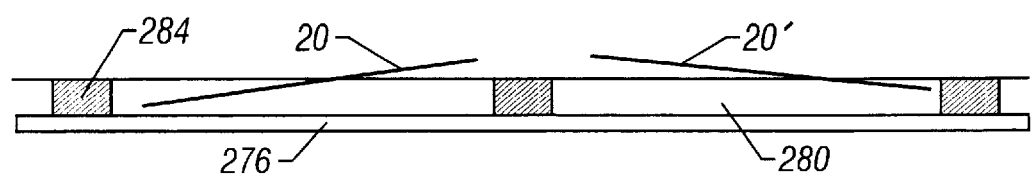
Figure 22E:
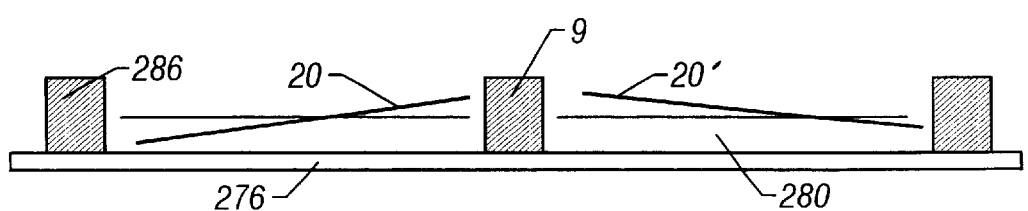

In yet another alternative mechanism, a blocking dam is placed between the mirrors to prevent cross-coupling of the mirrors, as illustrated in FIGS. 22A–22E. FIG. 22A depicts the mirror strip 270 along its length and shows how the air movement of the mirror 20 may couple momentum to the adjacent mirror 20'. It is seen how the rotation of mirror 20 can affect 20' through the movement of air in the almost closed channel 280 between the outer frame 274 and the substrate 276. Likewise, FIG. 21B shows the mirror strip using RIE etched ribs of the outer frame 274. Cross tie ribs (part of frame 274) may already be present in the frame 274 to provide increased structural stiffness. They may be in the form on anisotropically or near vertically RIE etched structures. The RIE rib structures generally require less space.

Referring to FIG. 21C, a dam 282 is introduced between the mirrors 20 and 20' to block air and minimize interaction between the mirrors 20 and 20'. The dam 282 is usually made out of the same material as the spacer and is also of the same height or slightly smaller. As illustrated in FIG. 21D, a silicon cross tie 284 on the outer frame 274 may also be in the form of a strip the thickness of the silicon mirror itself. This arrangement is advantageous in that the cross-tie can be narrower while still providing substantial air blockage, but does not require the same space as a cross-tie that is the full height of the outer frame 274.

Alternatively, and referring to FIG. 21E, there may be no cross tie between the mirrors, only an open space. In this case, the dam is a spacer 286, which may actually protrude through the structure above the mirror 20 as illustrated. These spacers 286 have typically a high aspect ratio, and can be made photolithographically using dry resists such as Vacrel or Riston, or other high aspect ratio resists such as Epson SU8 or similar materials well known in the lithographic art.

Other mechanisms for reducing the generated pressure wave may be used, as shown in FIGS. 23A–23F.

Figure 23E:
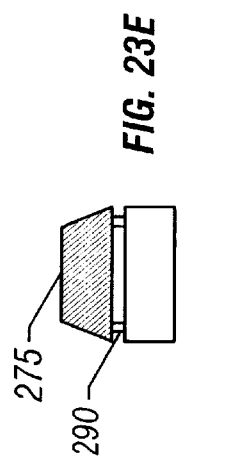
FIGS. 23A–23F are illustrations depicting a spacer configured to reduce buildup of pressure in an air channel.
Figure 23F:
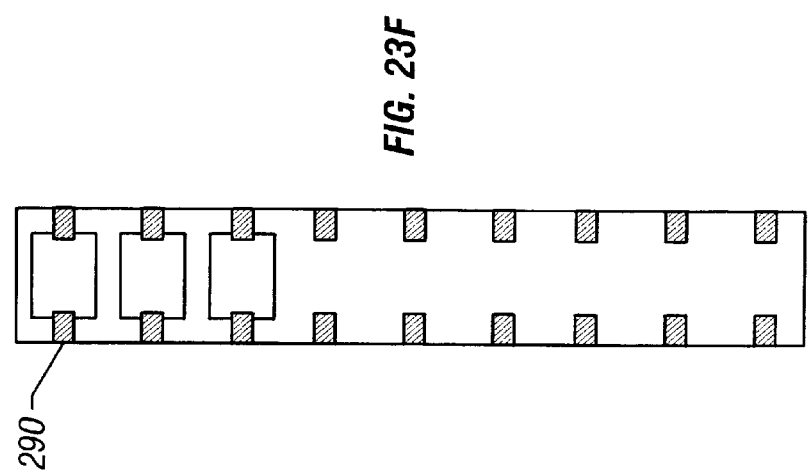
Figure 23C:
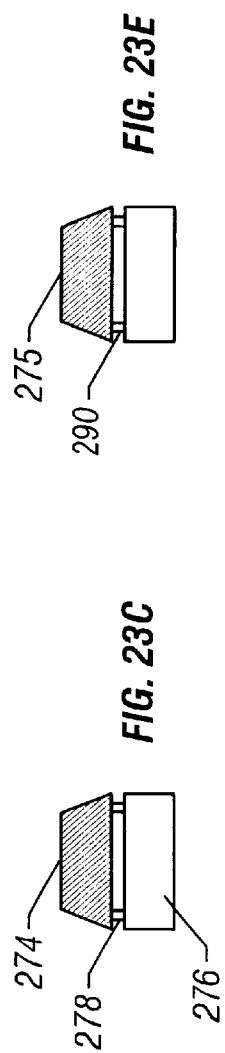
Figure 23D:
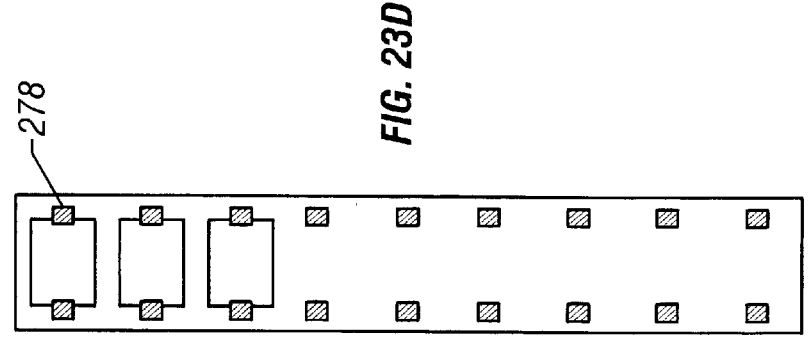
Figure 23A:
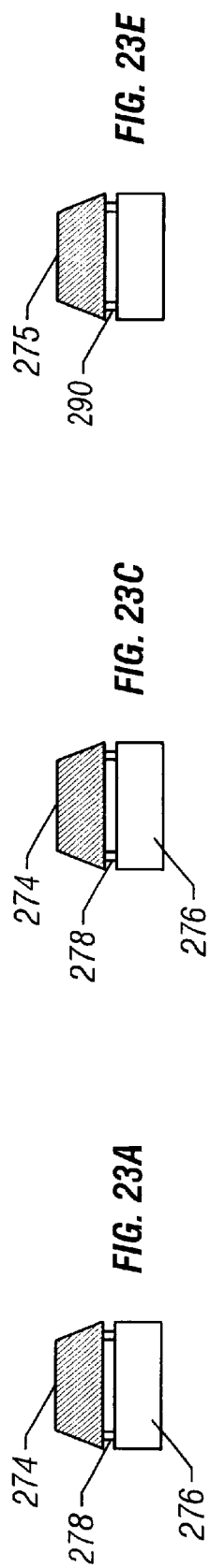
Figure 23B:
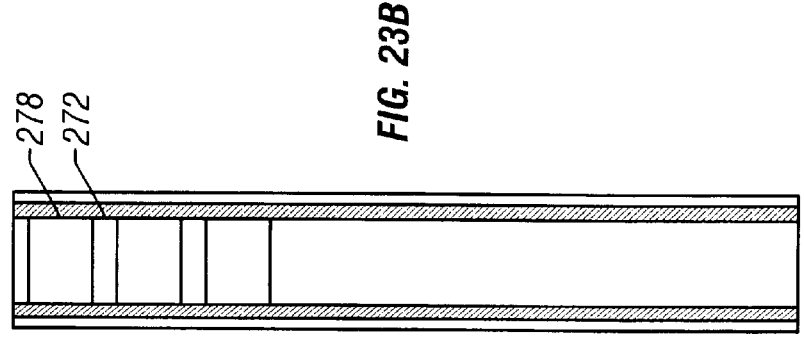

Referring to FIGS. 23A–B, the spacer 278 is applied along the length of the silicon frame 274, while in FIGS. 23C–23D, the spacer 278 is only applied selectively in places so as to provide a much more open structure for the dispersion of the air in the channel 280. Lateral open paths now exist, letting air escape laterally and thus reducing the build up of the pressure wave.

Alternatively, as shown in FIGS. 23E–23F, to increase the area of the spacer, spacer strips 290 may be made to run transverse to the silicon strip 274. This scheme prevents bending on the part of the scanner 272. In still yet another alternative, if contact bumps (not shown) are made precisely, the spacer 278 can be dispensed with entirely, as the strip 274 is held in place by the contacts of the solder or stud bumps to the silicon channel 280, thereby maximizing the dispersion of air in the underlying channel 280.

Figure 24A:
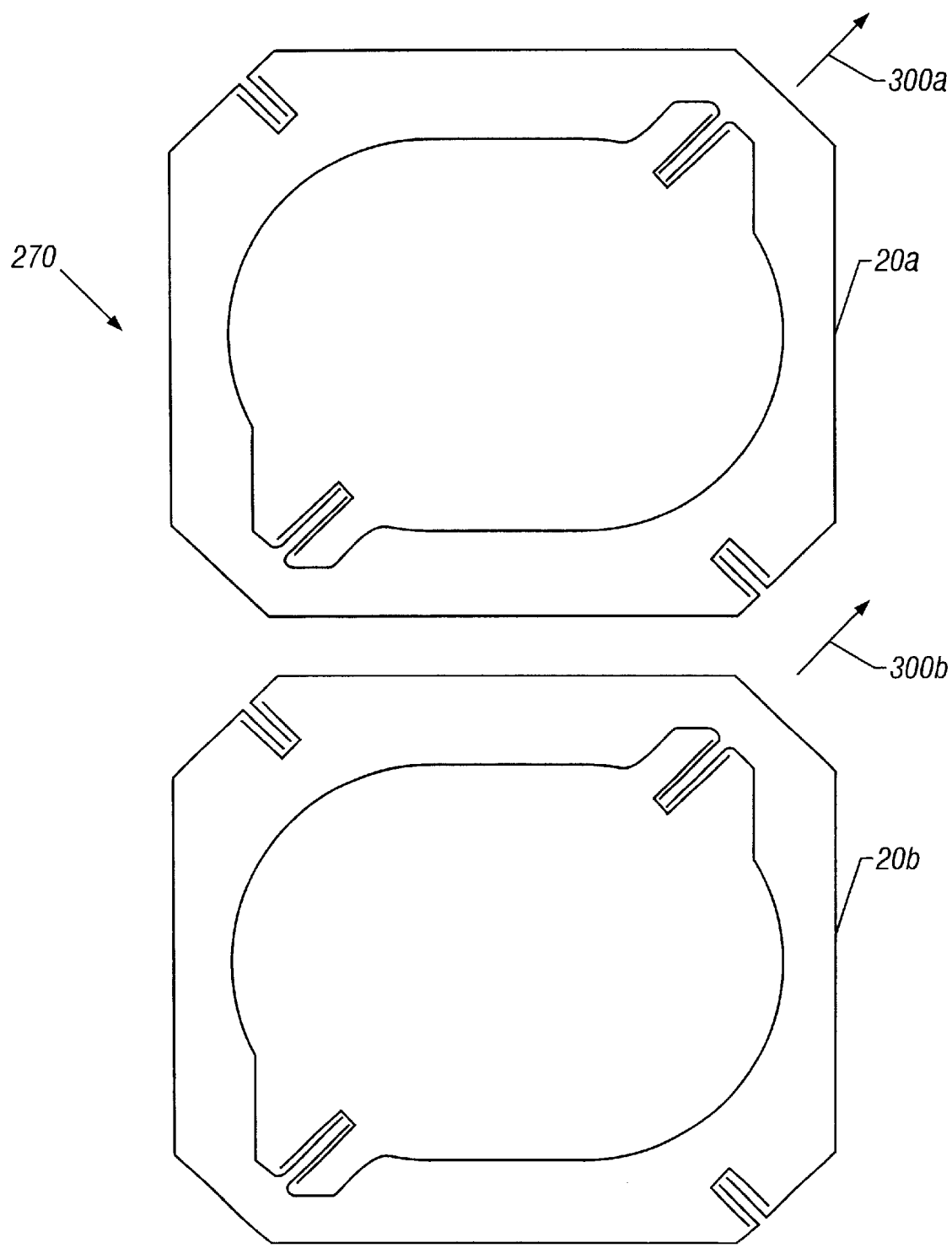
FIGS. 24A–24B are illustrations of the use of rotated deflection axes to shunt resulting airflow between adjacent mirrors.
Figure 24B:
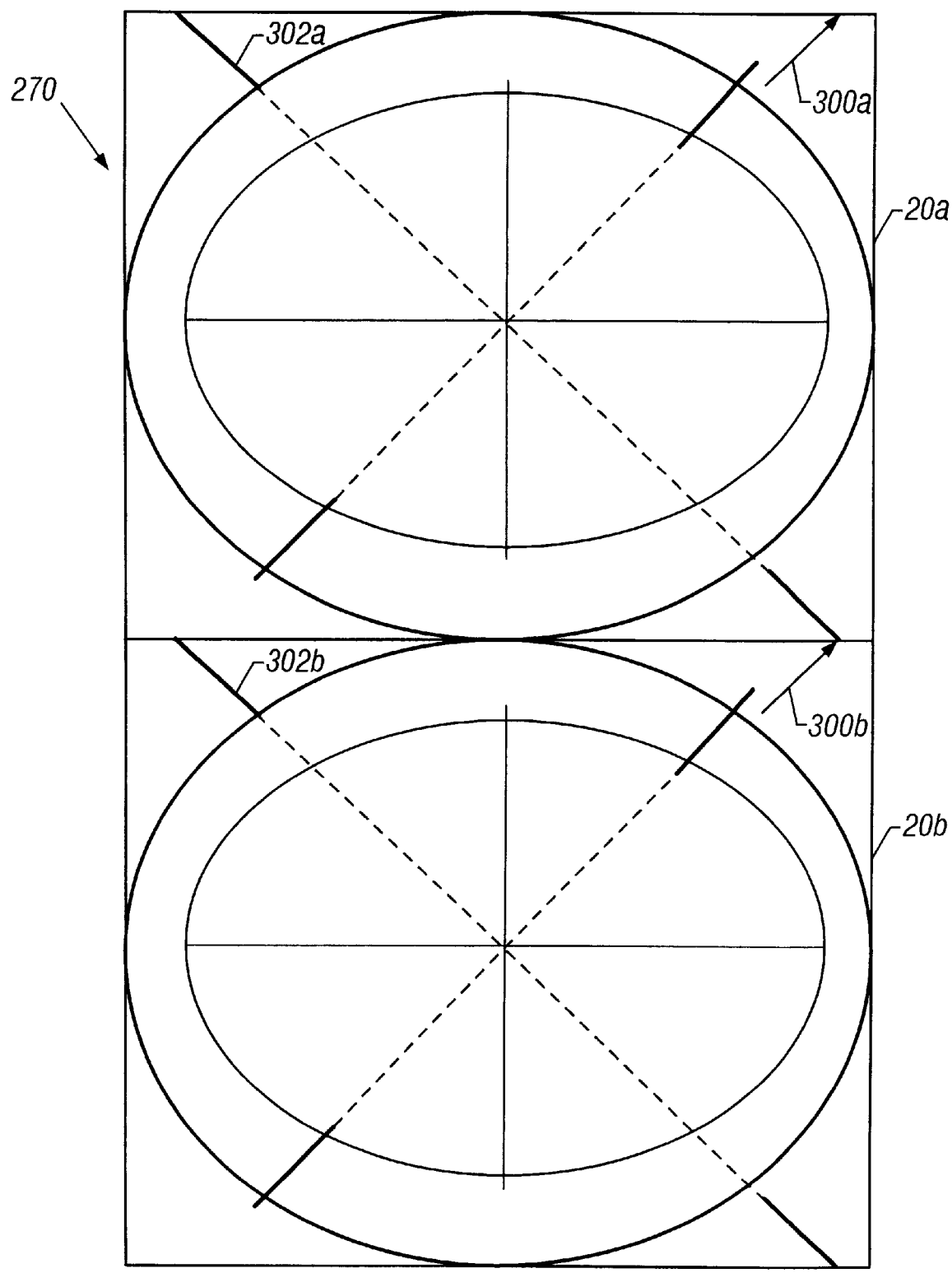

It is also possible to overcome the viscous interaction effect by directing the momentum of the air movement produced by one mirror as much as possible away from its nearest neighbors, as illustrated in FIGS. 24A and 24B.

Referring to FIG. 24A, in the mirror strip 270 (only partially shown), when a first mirror 20*a* is deflected around its outer axis, the resulting direction 300*a* of the airflow is close to 45 degrees to the length of the silicon strip. Hence, the pressure wave tends to dissipate itself towards the side of the strip without ever interacting strongly with the next neighbor, mirror 20*b*. Likewise, with the implementation of FIG. 24B, using elliptically shaped mirrors 20*a*, 20*b* rotating about axes 302*a*, 302*b*, respectively, in respective directions 300*a*, 300*b* the interaction is even further reduced because the shape is better aerodynamically. Hence, the impact of the flow on the adjacent mirror frames 20a, 20b is substantially less, because the effective interaction distance between those mirrors is also enlarged.

Figure 25:
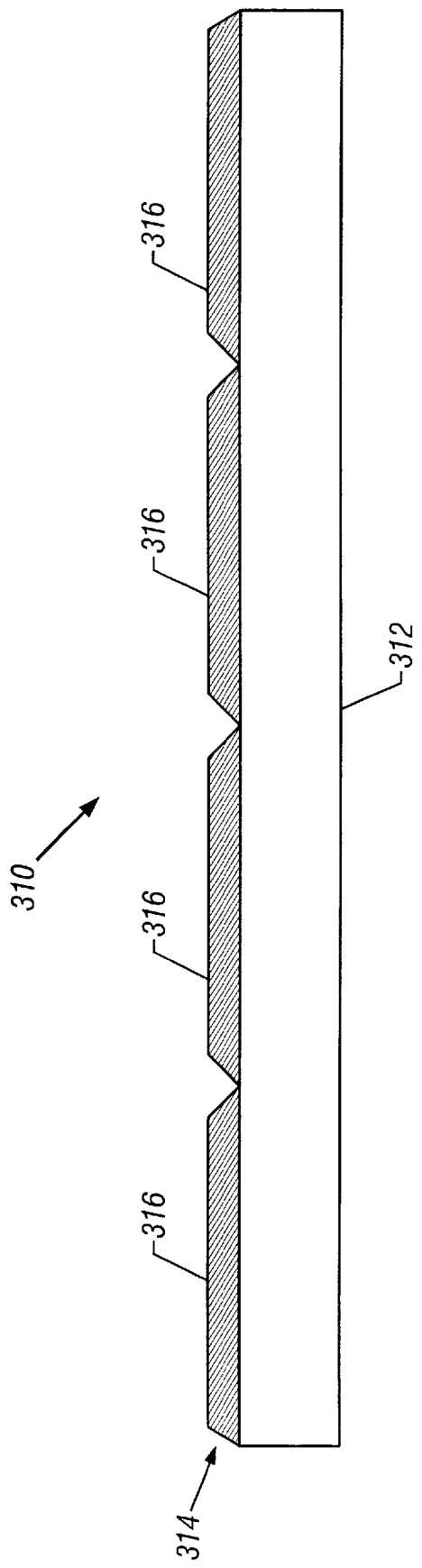
FIG. 25 is a depiction of a substrate with separated mirror strips to improve temperature matching.

Referring to FIG. 25, an alternative embodiment of the micro strip 10 of FIG. 1, is shown as a micro strip 310, having a substrate 12 coupled to a silicon strip 314. If material for the substrate 12 is chosen as aluminum-oxide or any material that does not match the expansion coefficient of silicon, the length of the silicon strip 274 is reduced so that the stresses stay minimal. That is, on contrast to the strip 26 (of FIG. 1), the silicon strip 314 includes several strip sections 316. The sectioning minimizes the longitudinal stresses. Further, based on the deformation of bimetallic strips, reducing the length of the strip by four reduces the overall bending due to thermal mismatch by a factor of four.

Although the foregoing describes the use of electrostatic deflection drive, many of the various techniques and mechanisms described herein are equally applicable to a micromirror structure or arrangement that uses electromagnetic deflection drive. One such arrangement is shown in FIGS. 26A–26B.

Figure 26A:
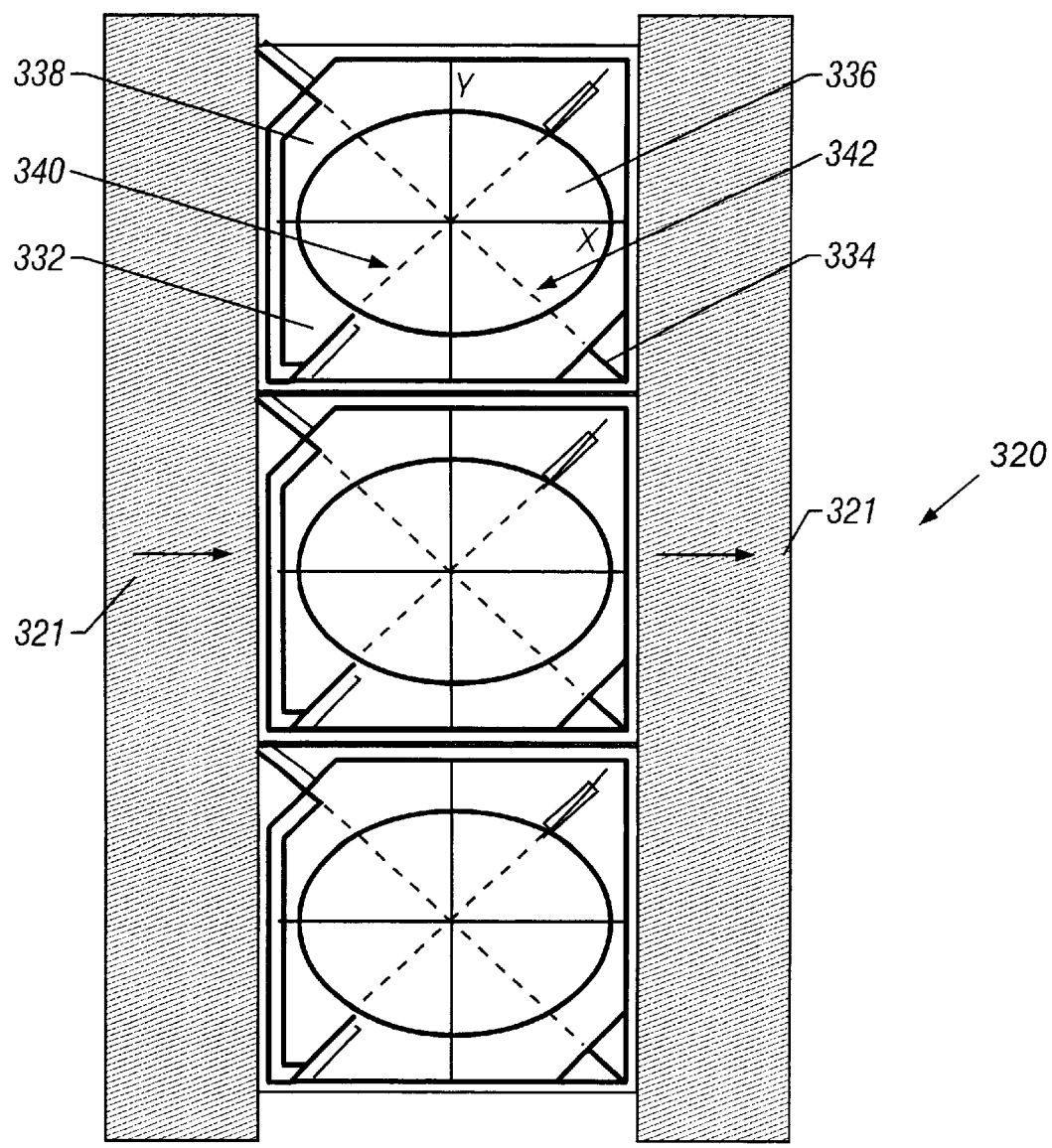
FIGS. 26A and 26B are plan and side views, respectively, of a micro-mirror strip assembly using a magnetic drive arrangement for controlling mirror movement.
Figure 26B:
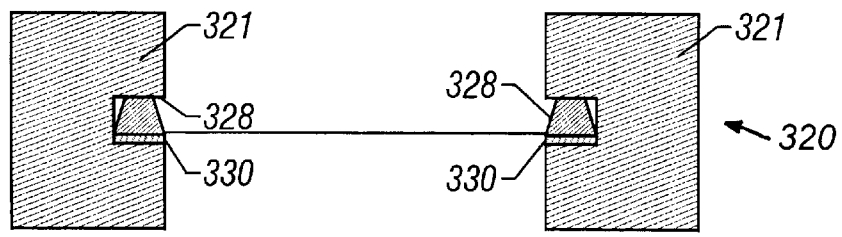

Referring to FIG. 26A, a strip assembly 320 that uses magnets 321 in conjunction with current loops 322 and 324 is shown. Magnets 321 produce a transverse magnetic field that is interacted upon by the two coils 322, 324. Referring to FIG. 26B, top silicon portions 326 are formed in grooves 328 in the magnets 321 on top of a substrate 330, which carries leads for the coils 322, 324. Torsion members 332, 334 coupled to and supporting mirror plates 336, 338, respectively, interact with the magnets 321, such interaction causing the torsion members to rotate about corresponding axes 340, 342, respectively, to position their respective mirror plates. The torque on the inner mirror plate 336 also produces a rotation on the outer axis 342 of the inner mirror plate 336, which may be controlled by an outer torsion sensor located on or near one the torsion members 334. Since the outer current loop 324 is completely outside of area of the inner mirror plate 336, the outer current loop 324 produces no specific rotation on that plate.

It will be understood that the rotational axes may be rotated to have the same deflection efficiency if the incident beam is at an angle relative to the plane of the mirror. For example, and referring back to FIG. 26A, the torsion members 332, 334 and corresponding axes 340, 342 are placed at 45 degree angles relative to the x and y axes in the plane of the mirror plates 334, 38 mirror to improves deflection efficiency in a balanced manner when the plane of the mirror in its rest position is at a 45 degree with respect to the incident beam.

Figure 27:
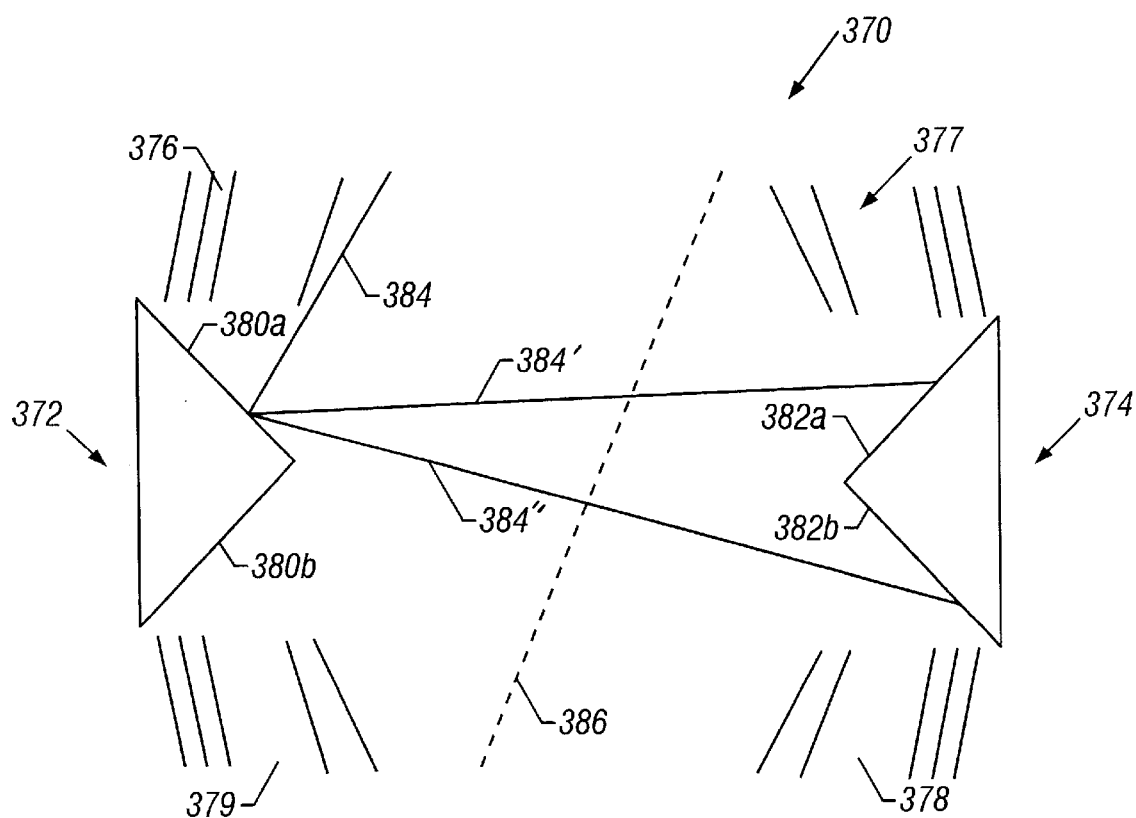
FIG. 27 is an illustration of a mirror arrangement for reducing the distance of collimators to their target mirrors.

Referring to FIG. 27, an optical path scheme 370 in which the separation between mirrors 372, 374 and select ones of collimator blocks 376, 377, 378 and 379. Each mirror block 372, 374 is shaped to have two separate angled sections or surfaces, 380a, 380b for block 372 and 382a, 382b for block 374. Thus, and by way of example, a beam 384 received from the collimator block 376 and hitting the mirror block 372 may be directed to either surface 382a, 382b of the opposite mirror block 374 by rays 384' and 384", respectively, for direction towards their targeted one of the collimator blocks 377 and 378. Thus, if the beam 384 is intended for the collimator block 377, it is directed along the path of the ray 384' to the surface 382a. If, on the other hand, the beam 384 is intended for the collimator block 378, it is directed along the path of the ray 384" towards the surface 382b. A folding mirror 386 can also be present in the arrangement to fold the optical path into a more compact form, as described in PCT Application Ser. No. 99 21139, incorporated herein by reference. Thus, the optical path scheme 370 advantageously provides for reduced collimator-to-mirror distances.

Figure 28A:
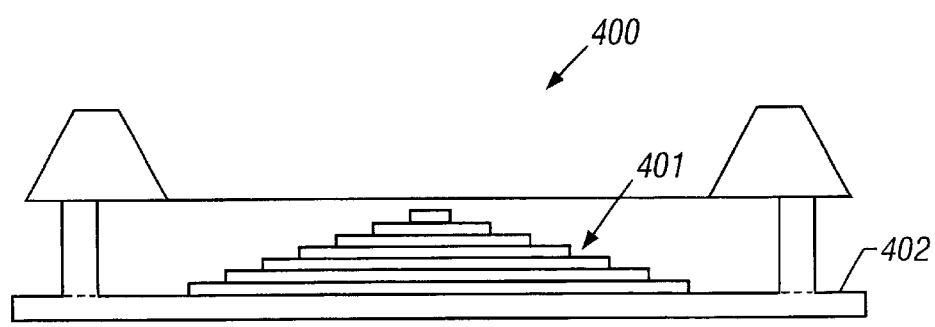
FIG. 28A is a side view of a micro-mirror strip assembly having plated, conical (or quasi-conical) electrodes.
Figure 28B:
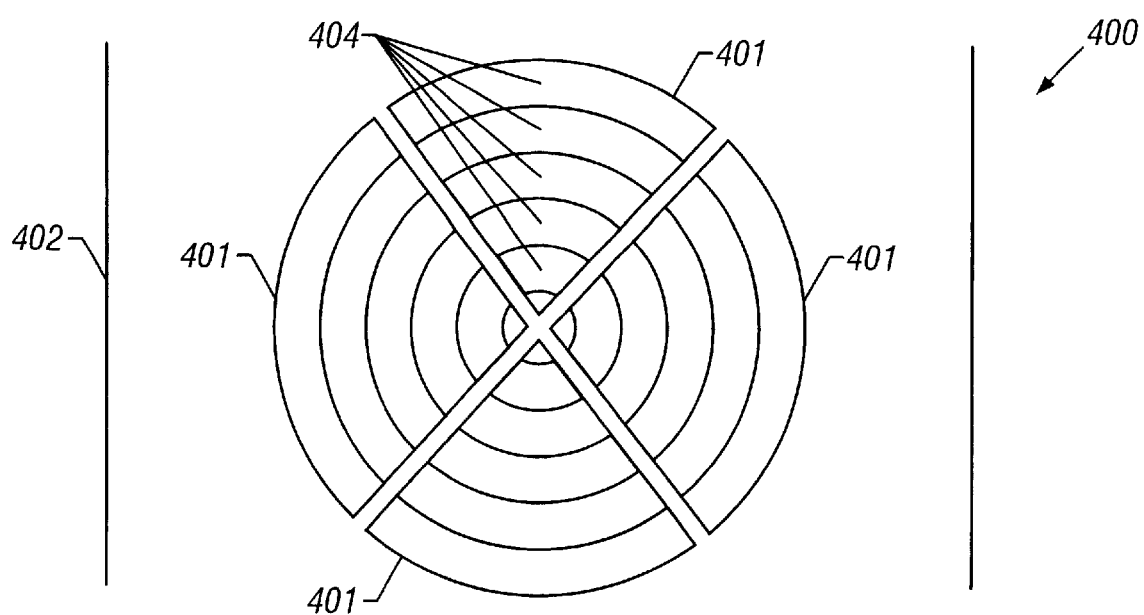
FIG. 28B is a top plan view of the micro-mirror strip assembly of FIG. 28A showing a single, plated electrode structure.

An alternative embodiment to the arrangement of electrodes on a conical shaped substrate, an arrangement of conical shaped electrodes on a substrate, 400, is shown in FIG. 28. Referring to FIG. 28A, electrodes 401 are constructed to form a raised structure on a flat substrate 402. Referring to FIG. 28B, the electrodes 401 are plated in steps 404, e.g., circular shaped platforms (as shown), onto the flat substrate 402. The electrodes 401 are plated in such a manner as to give rise to a form that is nearly the same as or similar to the form or shape of the raised portion 30 that is described as part of the substrate 16 in FIGS. 1A–1B above. Preferably, in the embodiment illustrated in FIGS. 28A–28B, the electrodes 401 are made of ceramic.

Other embodiments are within the scope of the following claims.

What is claimed is:

1. A structure comprising:
 a reference member having a raised portion thereon;
 a mirror suspended above the raised portion; and
 driving devices disposed on the raised portion to impart rotational motion to the mirror in two axes of direction.

2. The structure of claim 1, wherein the raised portion has a conical shape.

3. The structure of claim 1, wherein the raised portion has a quasi-conical shape.

4. The structure of claim 1m wherein the raised portion has a polygonal shape.

5. The structure of claim 1, wherein the mirror is coupled to the reference member by torsion hinges, and wherein the torsion hinges each comprise multiple, parallel vertical slots therein, the slots serving to partition the torsion hinge into narrow sections having a lower torque constant than the torsion hinge without such slots.

6. The structure of claim 5, wherein the narrow sections and vertical slots serve to maximize lateral and vertical stiffness while minimizing the torsional spring constant of the torsion hinges.

7. The structure of claim 5, wherein the torsion hinges include a torsional sensor.

8. The structure of claim 5, wherein the slots are etched through the full thickness of the hinge.

9. The structure of claim 1, further comprising:
 a mirror frame, the mirror being coupled to the mirror frame by a first pair of torsion hinges located along a first, inner rotational axis and the mirror frame being coupled to the reference member by a second pair of torsion hinges located along a second outer rotational axis; and
 wherein torsion hinges in each pair include a torsion sensor coupled to a torsion sensor select circuit, the torsion sensor select circuit for selecting one of the torsion sensors as active.

10. The structure of claim 9, wherein each of the torsion sensors has an input and an output and wherein the torsion select circuit includes select lines for selectively coupling the input of one of the sensors to a current source and the output to an instrumentation amplifier.

11. The structure of claim 9, wherein the driving devices are electrodes that are quartered to form electrodes in four corresponding quadrants of the raised portion.

12. The structure of claim 11, wherein the quartering is generally parallel to a first, inner rotational axis and the second, outer rotational axis.

13. The structure of claim 11, wherein the quartering is offset from the first, inner rotational axis and the second, outer rotational axis by approximately 45 degrees.

14. The structure of claim 11, further comprising a servo control unit, comprising:

an amplifier circuit for driving a corresponding one of the electrodes, the amplifier circuit receiving as inputs a biasing voltage and feedback signals from the torsion sensors, the inputs being weighted for each electrode and the feedback signals being inverted as necessary according to direction of rotation.

15. The structure of claim 9, wherein the torsion hinges, the mirror and the torsion sensors are fabricated to be of different thicknesses.

16. The structure of claim 9, wherein the torsional sensors each comprise a shielded sensor structure including a sensor implant layer and a shield applied over the sensor implant layer to stabilize sensor output and eliminate light sensitivity of such torsional sensor.

17. The structure of claim 1, wherein the reference member is a silicon substrate and the mirror is defined in a SOI top layer.

18. The structure of claim 17, further including an intermediate silicon layer disposed between the silicon substrate and the SOI top layer.

19. The structure of claim 17, further comprising sense amplifiers and currents sources embedded in the SOI top layer.

20. The structure of claim 17, further comprising sense amplifiers and currents sources embedded in the silicon substrate.

21. The structure of claim 1, wherein the mirror is coupled to the reference member by torsion hinges and the torsion hinges each comprise a torsion hinge having a steep return to the mirror to minimize bending on the mirror frame.

22. The structure of claim 1, wherein the mirror is coupled to the reference member by torsion hinges and the torsion hinges each comprise a folded torsion hinge having flexible members coupled by vertically stiff inner and outer members, the inner and outer members being tied together by a torsionally flexible, vertically stiff torsional element.

23. The structure of claim 1, wherein the mirror is coupled to the reference member by torsion hinges and wherein the torsion hinges each comprise a bending hinge including connection members which are connected by bands that are connected by end portions, wherein corresponding ones of the end portions in each band are connected by a torsion element that enables the end portions to rotate with respect to each other while being held together vertically.

24. The structure of claim 1, wherein the driving devices are electrodes and the electrodes are made of a highly resistive material.

25. The structure of claim 24, wherein the highly resistive material is polysilicon.

26. The structure of claim 1, wherein the driving devices are electrodes and the electrodes are coated with an insulating material in locations of the electrodes that may be in contact with the mirror.

* * * * *